United States Patent
Colson et al.

(10) Patent No.: US 11,292,622 B2
(45) Date of Patent: Apr. 5, 2022

(54) 3D PRINTED VEHICLE PACKAGING

(71) Applicants: Shay C. Colson, Bellingham, WA (US); David A. Divine, Spokane, WA (US); David S. Thompson, Spokane, WA (US)

(72) Inventors: Shay C. Colson, Bellingham, WA (US); David A. Divine, Spokane, WA (US); David S. Thompson, Spokane, WA (US)

(*) Notice: Subject to any disclaimer, the term of this patent is extended or adjusted under 35 U.S.C. 154(b) by 975 days.

(21) Appl. No.: 15/901,893

(22) Filed: Feb. 22, 2018

(65) Prior Publication Data

US 2018/0208336 A1 Jul. 26, 2018

Related U.S. Application Data

(63) Continuation of application No. 14/992,005, filed on Jan. 10, 2016, now abandoned, which is a
(Continued)

(51) Int. Cl.
*B65B 3/02* (2006.01)
*B65B 61/26* (2006.01)
(Continued)

(52) U.S. Cl.
CPC ............... *B65B 3/022* (2013.01); *A61J 1/03* (2013.01); *B29C 64/112* (2017.08);
(Continued)

(58) Field of Classification Search
CPC ..... B65B 3/022; B65B 61/182; B65B 61/007; B65B 61/26; B65B 61/025; B65B 63/005;
(Continued)

(56) References Cited

U.S. PATENT DOCUMENTS 8,239,169 B2   8/2012  Gregory et al.
9,016,617 B2 *  4/2015  Wang ..................... B64D 43/00
                                                   244/17.17
(Continued)

OTHER PUBLICATIONS

A Machine Learning Approach for Product Matching and Categorization, Petar Ristoski et al., IOS Press, 2016, 17 pages.
(Continued)

*Primary Examiner* — Charles R Kasenge

(57) ABSTRACT

Packages used to deliver items or other payloads via a drone may be customized and 3D printed to house the payload. The package may be customized to minimize the size and/or weight needed to house the payload. The customized packages may include one or more attachment mechanisms adapted to engage with or otherwise be coupled to the drone for delivery. Multiple individual customized packages can be secured together into a composite package for delivery by drone. The customized package may be designed to be aerodynamic given the shape of the payload and the flight characteristics of the drone. The drone itself may be the package, with the payload housed within a portion of the drone. The package and/or a portion of the drone (e.g., fuselage, wing, body, frame, etc.) may be printed at least partially in, on, or around an item or package to be transported by the drone.

10 Claims, 17 Drawing Sheets

Related U.S. Application Data continuation of application No. 14/146,725, filed on Jan. 3, 2014, now Pat. No. 9,248,611, application No. 15/901,893, which is a continuation of application No. 15/721,731, filed on Sep. 29, 2017, now abandoned.

(60) Provisional application No. 61/887,973, filed on Oct. 7, 2013, provisional application No. 62/403,125, filed on Oct. 1, 2016, provisional application No. 62/485,967, filed on Apr. 16, 2017, provisional application No. 62/462,355, filed on Feb. 23, 2017.

(51) Int. Cl.

| | |
|---|---|
| *A61J 1/03* | (2006.01) |
| *B33Y 80/00* | (2015.01) |
| *B29C 64/176* | (2017.01) |
| *B29C 64/112* | (2017.01) |
| *B29C 64/171* | (2017.01) |
| *B29C 64/182* | (2017.01) |
| *B29C 64/106* | (2017.01) |
| *B65B 61/18* | (2006.01) |
| *G05B 19/4099* | (2006.01) |
| *B65B 61/00* | (2006.01) |
| *B65D 75/52* | (2006.01) |
| *B65D 65/38* | (2006.01) |
| *B65D 21/02* | (2006.01) |
| *B33Y 10/00* | (2015.01) |
| *B29C 70/70* | (2006.01) |
| *B29C 70/68* | (2006.01) |
| *B33Y 50/02* | (2015.01) |
| *B33Y 30/00* | (2015.01) |
| *B65B 61/02* | (2006.01) |
| *B65B 63/00* | (2006.01) |
| *B29C 64/386* | (2017.01) |
| *B64B 1/06* | (2006.01) |
| *B29L 31/00* | (2006.01) |
| *B29K 25/00* | (2006.01) |
| *B29K 105/20* | (2006.01) |
| *B29L 31/60* | (2006.01) |

(52) U.S. Cl.
CPC .......... *B29C 64/171* (2017.08); *B29C 64/176* (2017.08); *B29C 64/182* (2017.08); *B29C 64/386* (2017.08); *B29C 70/688* (2013.01); *B29C 70/70* (2013.01); *B33Y 10/00* (2014.12); *B33Y 50/02* (2014.12); *B33Y 80/00* (2014.12); *B65B 61/007* (2013.01); *B65B 61/182* (2013.01); *B65B 61/26* (2013.01); *B65D 21/0206* (2013.01); *B65D 65/38* (2013.01); *B65D 75/527* (2013.01); *G05B 19/4099* (2013.01); *B29K 2025/06* (2013.01); *B29K 2105/20* (2013.01); *B29L 2031/608* (2013.01); *B29L 2031/712* (2013.01); *B33Y 30/00* (2014.12); *B64B 1/06* (2013.01); *B65B 61/025* (2013.01); *B65B 63/005* (2013.01); *G05B 2219/35134* (2013.01); *G05B 2219/49007* (2013.01)

(58) Field of Classification Search
CPC ... B29C 64/386; B29C 64/171; B29C 64/112; B29C 64/182; B29C 64/176; B29C 70/70; B29C 70/688; B65D 21/0206; B65D 75/527; B65D 65/38; B33Y 10/00; B33Y 80/00; B33Y 50/02; B33Y 30/00; A61J 1/03; G05B 19/4099; G05B 2219/35134; G05B 2219/49007; B64B 1/06; B29K 2025/06; B29K 2105/20; B29L 2031/608; B29L 2031/712

See application file for complete search history.

(56) References Cited

U.S. PATENT DOCUMENTS

| | | | | |
|---|---|---|---|---|
| 9,221,536 | B2* | 12/2015 | Wang | B64C 27/00 |
| 9,221,537 | B2* | 12/2015 | Wang | G05D 1/00 |
| 9,233,754 | B1* | 1/2016 | Wang | B64C 1/30 |
| 9,248,611 | B2 | 2/2016 | Divine et al. | |
| 9,284,049 | B1* | 3/2016 | Wang | B64C 27/54 |
| 9,321,530 | B2* | 4/2016 | Wang | G01R 33/0047 |
| 9,384,668 | B2* | 7/2016 | Raptopoulos | G05D 1/104 |
| 9,414,501 | B2* | 8/2016 | Wicker | H05K 3/321 |
| 10,518,490 | B2* | 12/2019 | Wicker | B29C 70/82 |
| 10,748,867 | B2* | 8/2020 | Wicker | H05K 1/183 |
| 2002/0079601 | A1 | 6/2002 | Russell et al. | |
| 2004/0117273 | A1 | 6/2004 | Henderson | |
| 2005/0256776 | A1 | 11/2005 | Bayoumi et al. | |
| 2006/0087391 | A1* | 4/2006 | Ferro | B63B 21/02 335/284 |
| 2006/0108477 | A1* | 5/2006 | Helou, Jr. | B64C 1/10 244/137.1 |
| 2006/0119060 | A1* | 6/2006 | Sullivan | B62B 5/0083 280/79.11 |
| 2008/0149763 | A1* | 6/2008 | Wakayama | B64C 1/22 244/118.1 |
| 2009/0308902 | A1* | 12/2009 | Rex | B60R 9/055 224/315 |
| 2010/0012769 | A1* | 1/2010 | Alber | B64C 39/02 244/17.23 |
| 2011/0084162 | A1* | 4/2011 | Goossen | B64D 1/22 244/12.1 |
| 2011/0130636 | A1* | 6/2011 | Daniel | G08B 21/02 600/301 |
| 2012/0061507 | A1* | 3/2012 | Grabmeier | B64D 1/12 244/3.15 |
| 2012/0238160 | A1* | 9/2012 | Pfeil | B63H 23/321 440/3 |
| 2013/0170171 | A1* | 7/2013 | Wicker | H01L 21/4846 361/809 |
| 2013/0297062 | A1* | 11/2013 | Lacaze | B29C 64/112 700/119 |
| 2014/0032034 | A1* | 1/2014 | Raptopoulos | G05D 1/0088 701/25 |
| 2014/0217230 | A1* | 8/2014 | Helou, Jr. | B64C 39/024 244/17.17 |
| 2014/0332620 | A1* | 11/2014 | Earon | B64D 47/08 244/13 |
| 2015/0001762 | A1* | 1/2015 | Lacaze | B29C 64/171 264/308 |
| 2015/0052025 | A1 | 2/2015 | Apsley et al. | |
| 2015/0145158 | A1 | 5/2015 | Levine et al. | |
| 2015/0158587 | A1* | 6/2015 | Patrick | B64D 1/22 244/137.4 |
| 2015/0249043 | A1 | 9/2015 | Elian et al. | |
| 2016/0098730 | A1 | 4/2016 | Feeney | |
| 2016/0122043 | A1 | 5/2016 | Divine et al. | |
| 2016/0152358 | A1 | 6/2016 | Divine et al. | |
| 2016/0244165 | A1* | 8/2016 | Patrick | B64D 1/12 |
| 2016/0280403 | A1 | 9/2016 | Colson et al. | |
| 2017/0046806 | A1 | 2/2017 | Haldenby et al. | |
| 2017/0253354 | A1 | 9/2017 | Colson et al. | |
| 2017/0253401 | A1 | 9/2017 | Bouthillier | |
| 2017/0257358 | A1 | 9/2017 | Ebrahimi et al. | |
| 2018/0038983 | A1* | 2/2018 | Pai | G01V 3/16 |
| 2018/0089645 | A1 | 3/2018 | McDonald et al. | |
| 2018/0253981 | A1* | 9/2018 | Raptopoulos | H04B 7/18506 |

OTHER PUBLICATIONS

SAP and UPS work to attract partners to join Distributed Manufacturing early adopter program, Printer and 3D Printing News, http://www.3ders.org/articles/20160922-sap-and-ups-work-to-attract-

(56) References Cited

OTHER PUBLICATIONS partners-to-join-distributed-manufacturing-early-adopter-program. html, Sep. 22, 2016, 8 pages.
3D Hubs, Wikipedia, https://en.wikipedia.org/wiki/3D_Hubs, accessed on Feb. 3, 2018, 2 pages.
3D Hub, Your go-to service for ordering custom parts online, https://www.3dhubs.com/how-to-3d-print, accessed on Feb. 3, 2018, 2 pages.
Thingiverse features "Get This Printed" button to allow users to order 3D prints directly via 3D Hubs, Printer and 3D Printing News, http://www.3ders.org/articles/20150421-thingiverse-features-get-this-printed-button-order-3d-prints-directly-via-3d-hubs.html, 8 pages.
Notification of Transmittal of the International Search Report and Written Opinion of the International Searching or Authority, dated Jan. 18, 2018, from PCT/US17/54643 which is a counterpart of the instant application, 17 pages.
You can now 3D print digital traceability information, Securing Pharma, by Katrina Megget, Apr. 10, 2018, accessed at https://www.securingindustry.com/electronics-and-industrial/you-can-now-3d-print-digital-traceability-information/s105/a7354/?cmd=PrintView&nosurround=true, 2 pages.
Office Action dated Jan. 22, 2018 in U.S. Appl. No. 15/721,726, to James L. Schmeling, 18 pages.
Delivering packages with drones might be good for the environment, The Conversation, by Samaras et al., Feb. 13, 2018, accessed at http://theconversation.com/delivering-packages-with-drones-might-be-good-for-the-environment-90997, 5 pages.
How 3D printing empowers packaging operations, By Lisa McTigue Pierce, Optimization (accessed at http://www.packagingdigest.com/optimization/how-3d-printing-empowers-packaging-operations141014), Oct. 15, 2014, 3 pages.
Packaging 3D Print—The Global Upheaval That's About to Occur, by John Hauer, 3DPrint.com (accessed at http://3dprint.com/80700/packaging-3d-print/), Jul. 12, 2015, 8 pages.
Adobe co-develops 3D printing software to improve structural designs, By Justin Rubio (accessed at http://www.theverge.com/users/Justin%20Rubio), Sep. 20, 2012, 3 pages.
Stava et al., Stress Relief: Improving Structural Strength of 3D Printable Objects, available at least as early as Oct. 1, 2013, 11 pages.
3D Printing, Opportunities In Packaging, Get3DSmart, by John Hauer, available at least as early as Aug. 6, 2016, 69 pages.
Port of Rotterdam Launches Blockchain Lab, BTCMANGAGER, by Joseph Young, Sep. 29, 2017, 6 pages.
Flexport's epic plan to build a freight empire with its $110M raise, TechCrunch, by Josh Constine, Oct. 6, 2017, 10 pages.
SenseAware, a FedEx innovation, accessible at http://www.senseaware.com/how-it-works/, available at least as early as Oct. 2, 2017, 5 pages.
FedEx Introduces SenseAware, the Next Generation Supply Chain Information Platform, accessible at http://about.van.fedex.com/newsroom/fedex-introduces-senseaware-the-next-generation-supply-chain-information-platform/, Nov. 17, 2009, 6 pages.
SenseAware is FedEx's IoT response to supply chain optimization, RCRWireless News, by Phillip Tracy, available at https://www.rcrwireless.com/20160929/big-data-analytics/fedex-iot-tag31, Sep. 29, 2016, 5 pages.
Digital Print Solutions for Smart Packaging, Xerox, available at https://www.xerox.com/en-us/digital-printing/packaging-solutions/smart?CMP=PPC-PSG&HBX_PK=Smart_Packaging&HBX_OU=50&ADGRP=Packaging_-_Digital_Smart_Packaging_, available at least as early as Oct. 3, 2017, 5 pages.
Getting Smart with Digitally Printed Packaging, Xerox, available at https://www.xerox.com/en-us/digital-printing/packaging-solutions, available at least as early as Oct. 3, 2017, 6 pages.
Finding Blockchain-Based Security Solutions for the 3D Printing Economy, Bitcoin Magazine, by Giulio Prisco, available at http://www.nasdaq.com/article/finding-blockchain-based-security-solutions-for-the-3d-printing-economy-cm828884, Aug. 8, 2017, 3 pages.
Trusted Internet of Things and Smart Supply Chain Solutions, Chronicled, available at https://www.chronicled.com/, available at least as early as Aug. 9, 2017, 3 pages.
Blockchain and the future of retail, ETRetail.com, by Singaravelu Ekambaram and Lata Varghese, Aug. 22, 2017, 6 pages.
3D printed Smart Tags ensure 100% authenticity of collectible shoes, www.3ders.org, by Kira, Mar. 10, 2016, 12 pages.
Cubichain Stores Data of 3D Printed Aircraft Parts in Blockchain, 3D Printing, Aerospace 3D Printing, Business, By Joseph Young, Dec. 7, 2016, 9 pages.
Voodoo Manufacturing, Small-Batch Manufacturing With High-Volume 3D Printing, Voodoo Manufacturing, Available at least as early as Sep. 10, 2017, 20 pages.
Pharma Giants Use Ethereum Network to Prevent Counterfeit Medicine, BTCMANAGER, by Joseph Young, Sep. 25, 2017, 4 pages.
C3IOT, AI & IoT Software Platform for Digital Transformation, available at https://c3iot.com/, available at least as early as Aug. 18, 2017, 5 pages.
Smart sensors improve packaging machinery performance, Packaging Digest—Automation, by Mark Langridge, Apr. 15, 2015, 6 pages.
Smart Contracts: 12 Use Cases for Business & Beyond, Prepared by: Smart Contracts Alliance—In collaboration with Deloitte, available at http://bloq.com/assets/smart-contracts-white-paper.pdf, Dec. 2016, 56 pages.
Technology Innovation Profile: 3D Printing and Going Local, FedEx Healthcare Solutions, http://www.fedex.com/us/healthcare/knowledge-center/technology/technology-innovation-profile-3d-printing-and-going-local.html, available at least as early as Oct. 6, 2017, 3 pages.
3D Printing will make manufacturing local, Epson Insights, Jun. 12, 2017, 5 pages.
The race to connect smart contracts to the real world, American Banker, By Brian Patrick Eha, Aug. 7, 2017, 8 pages.

* cited by examiner

3D PRINTED VEHICLE PACKAGING

RELATED APPLICATIONS

This application is a continuation of U.S. patent application Ser. No. 14/992,005, filed Jan. 10, 2016, titled "3-D Printed Packaging," which is a continuation of U.S. patent application Ser. No. 14/146,725, filed Jan. 3, 2014, titled "3-D Printed Packaging," which claims the benefit of U.S. Provisional Application No. 61/887,973, filed Oct. 7, 2013, all of which are incorporated herein by reference.

This application is also a continuation of U.S. patent application Ser. No. 15/721,731, filed Sep. 29, 2017, titled "Distributed Manufacturing," which claims the benefit of U.S. Provisional Application No. 62/403,125, filed Oct. 1, 2016, titled "Distributed Manufacturing," and U.S. Provisional Application No. 62/485,967, filed Apr. 16, 2017, titled "Blockchain Enabled Packaging," all of which are incorporated herein by reference.

This application also claims priority to U.S. Provisional Application No. 62/462,355, filed Feb. 23, 2017, and titled "3D Printed Vehicle Packaging," which is incorporated herein by reference.

BACKGROUND

In recent years, the prevalence of unmanned aerial vehicles (UAVs) or "drones" has increased. Drones can be remotely controlled by human pilots using wireless communication (e.g., radio frequency, infrared, etc.), autonomous (i.e., capable of traveling from an origination to a destination without human control), or semi-autonomous (i.e., capable of performing portions of a trip autonomously, such as following a beacon or object, or maintaining a position relative to a location or object). Manually controlled drones have become popular for recreational use by hobbyists, and drone racing has recently gained popularity. In addition, drones have begun to be used commercially for aerial photography and surveillance, among other uses. Drones are beginning to be used to deliver packages to businesses and residences and medicines to remote locations. However, due to their relatively small size and power, drones are limited to carrying relatively small, lightweight payloads.

DETAILED DESCRIPTION

Figure 1A:
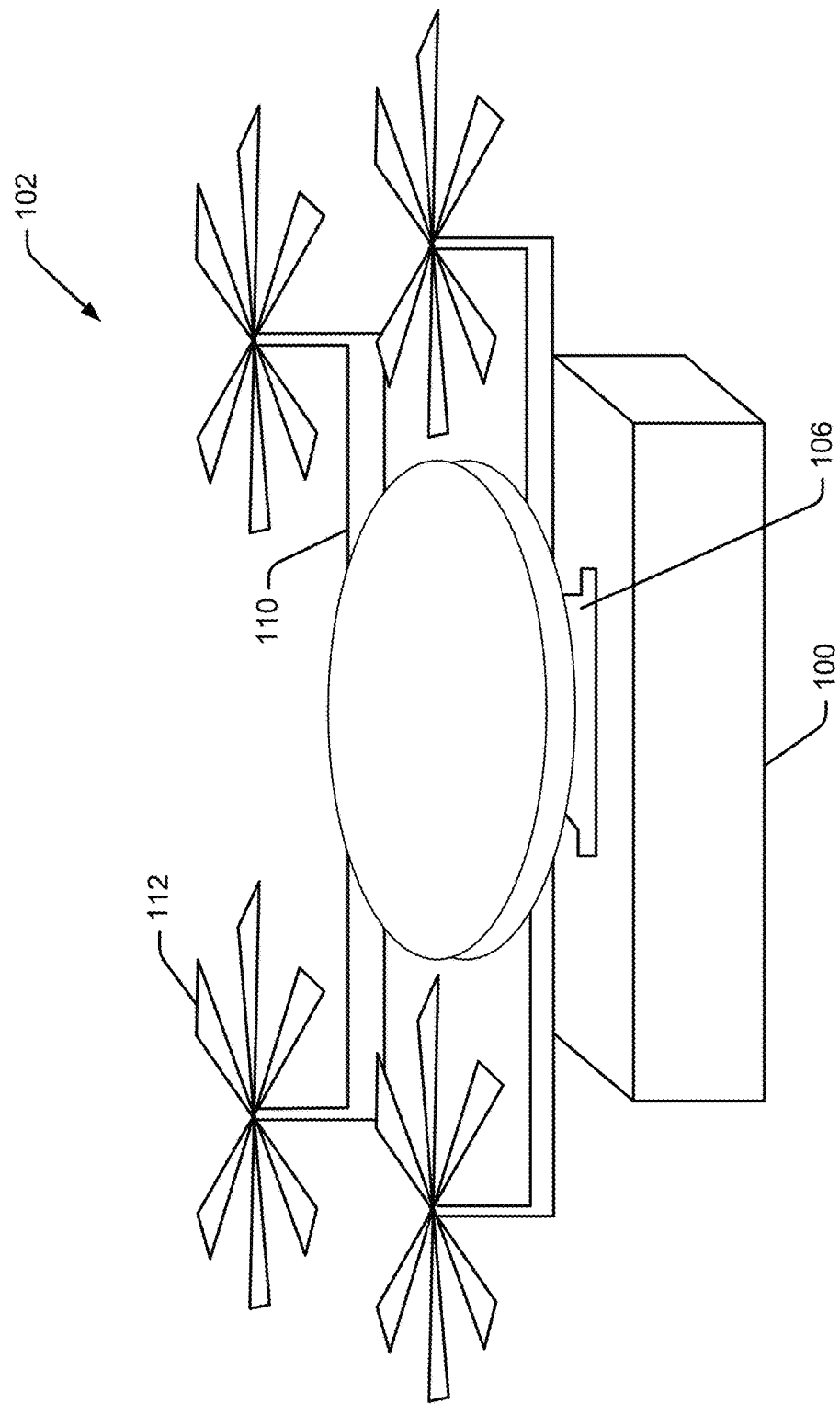
FIG. 1A is a perspective view of example customized packaging created to facilitate a physical connection with a drone via docking or otherwise engaging a top of the package with an underside of the drone.

As discussed above, due to their relatively small size and power, drones are limited to carrying relatively small, lightweight payloads. The payload that the drone is able to carry is further limited by the weight of the package used to house the payload and one or more attachment mechanisms used to couple the package to the drone. Furthermore, traditional packages are not adapted to be held by a drone. Thus, existing uses of drones to deliver packages have limited usefulness.

This application describes techniques for generating packaging to deliver items or other payloads via a drone. In some examples, this application describes generating customized packages by, for example, 3D printing to house the payload in a package that is the minimum size and weight needed to house the payload. Examples using 3D printed packaging facilitate a variety of ways to integrate with drones or other vehicles for delivery of a package or other payload. The customized packages may include one or more attachment mechanisms that are adapted to engage with or otherwise be coupled to the drone for delivery. In some examples, multiple individual customized packages can be secured together into a composite package for delivery by a drone. In some examples, the customized package may be designed to be as aerodynamic as possible given the shape of the payload and the flight characteristics of the drone. In some examples, the techniques described herein minimize or eliminate the weight of packaging to house a payload entirely by housing the payload within a portion of the drone itself. In some examples, the package and/or a portion of a drone (e.g., fuselage, wing, body, frame, etc.) may be printed at least partially in, on, or around an item or package to be transported by the drone.

In some examples, by reducing the size and/or weight of packaging, or integrating the payload within a portion of the drone, the techniques described herein may allow drones to carry heavier and/or larger payloads, or may enable a smaller or lower powered drone to carry a given payload. Additionally or alternatively, the techniques described herein may reduce the energy consumption required by a drone to deliver a given payload relative to conventional techniques. Still further, by customizing the packaging of a payload, an amount of material required to package the payload is reduced, thereby reducing packaging wasted. These and/or numerous other benefits may be accomplished using the techniques described herein.

While many of the examples described herein are described in the context of unmanned aerial vehicles (UAVs), the techniques are not limited use with UAVs and can be used in connection with other types of unmanned vehicles as well, such as land vehicles, water vehicles, and spacecraft. As used herein, the term "drone" means any unmanned vehicle including UAVs (e.g., rotor driven, fixed wing, lighter-than-air airships, etc.), unmanned land vehicles (e.g., cars, trucks, busses, motorcycles, trains, wheeled or walking robots, etc.), unmanned water vehicles (e.g., boats, submarines, hover craft, etc.), unmanned spacecraft (e.g., rockets, space capsules, shuttles, spaceplanes, etc.). Moreover, the techniques are applicable to remotely controlled vehicles, autonomous vehicles, and semi-autonomous vehicles. Still further, in some examples, aspects of this application may be applicable to generate packaging for manually operated versions of any of the vehicles described herein. These and other aspects are described below with reference to the accompanying figures.

Figure 1B:
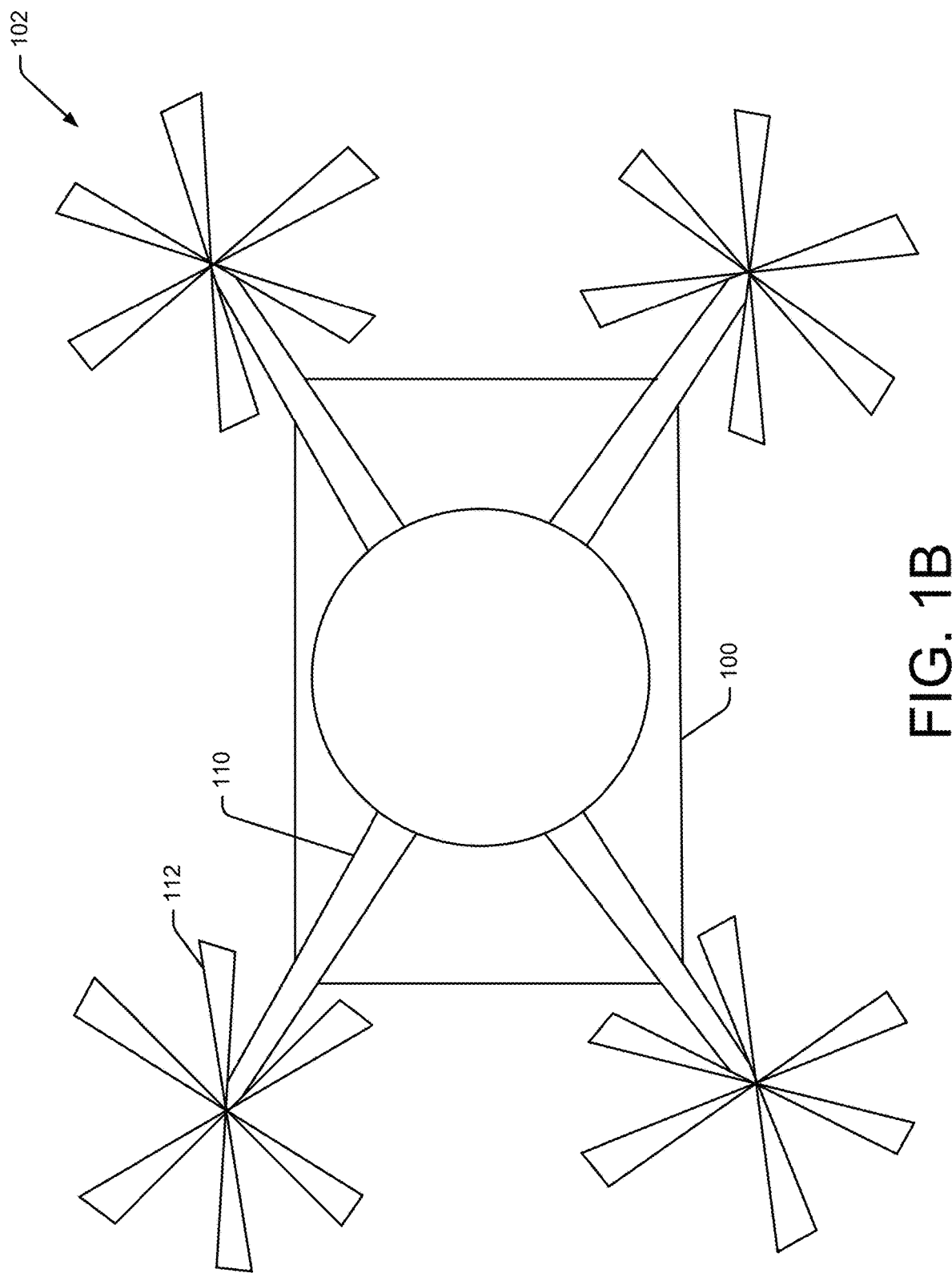
FIG. 1B is a top view of the example customized packaging of FIG. 1A coupled to a drone.
Figure 1C:
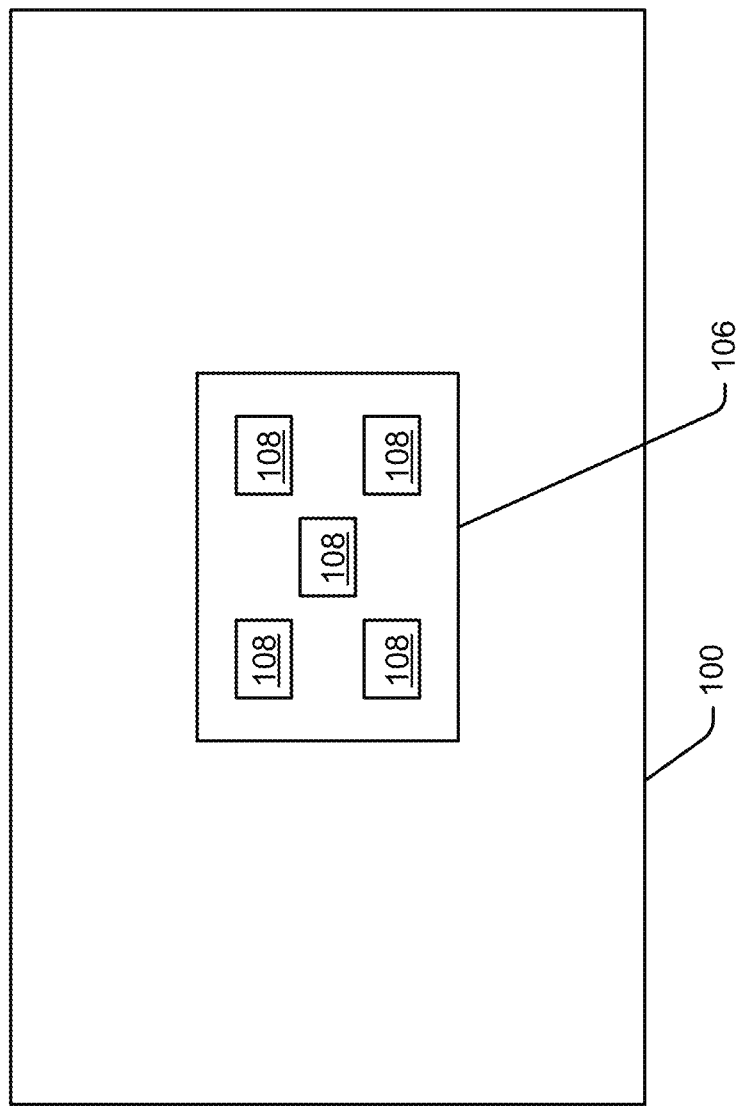
FIG. 1C is a top view of the example customized packaging of FIG. 1A with the drone omitted for visibility of a top of the package.

FIGS. 1A-1C illustrate an example in which customized packaging is generated (e.g., a 3D printed package (or simply "package") 100 is created to facilitate a physical connection with a drone 102 via docking or otherwise engaging the package 100 with the drone 102. Depending on the design of the drone 102, the package 100 may have a docking capability (e.g., an attachment mechanism) 104 integrated on top of the package 100 so as to connect to the bottom of the drone 102. FIG. 1C illustrates the package 100 with the drone 102 omitted to show the attachment mechanism 104 more clearly. By way of example and not limitation, the attachment mechanism 104 may include one or more platforms, hooks, loops, pins, flanges, brackets, straps, notches, magnets, latches, threads, snap connectors, fasteners, snap connections, tongue and groove connections, twist connections, pneumatic connections, and/or other features designed to facilitate consistent and secure coupling of the package 100 to the drone 102. In some examples, the drone 102 may include one or more complimentary attachment mechanisms 106 on an underside of the drone 102 to support, couple to, secure, or otherwise engage the attachment mechanism(s) 104 of the package 100. When included, the attachment mechanism(s) 106 of the drone 102 may include, by way of example and not limitation, one or more platforms, hooks, loops, pins, flanges, brackets, straps, notches, magnets, latches, threads, snap connectors, fasteners, snap connections, tongue and groove connections, twist connections, pneumatic connections, and/or other features designed to support, couple to, secure, or otherwise engage the attachment mechanism(s) 104 of the package 100. In the illustrated example, the attachment mechanism(s) 104 of the package include multiple connectors 108 (e.g., snap connectors, ferromagnetic elements, etc.) that couple to and are held in place by corresponding components (e.g., receptacles, electromagnets, etc.) of the attachment mechanism(s) 106 of the drone 102. In some examples, the attachment mechanism(s) 104 of the package and/or the attachment mechanism(s) 106 of the drone 102 may be selectively activated to attach the package 100 to the drone 102 or deactivated to release the package 100 from the drone 102.

In the illustrated example, the drone 102 includes a body or frame 110 and multiple rotors 112 (e.g., a so called quad-copter design). However, in other examples, other drone types are contemplated such as a fixed wing aircraft, a lighter-than-air airship such as a blimp or dirigible, a land vehicle, a water vehicle, or a spacecraft.

Figure 2A:
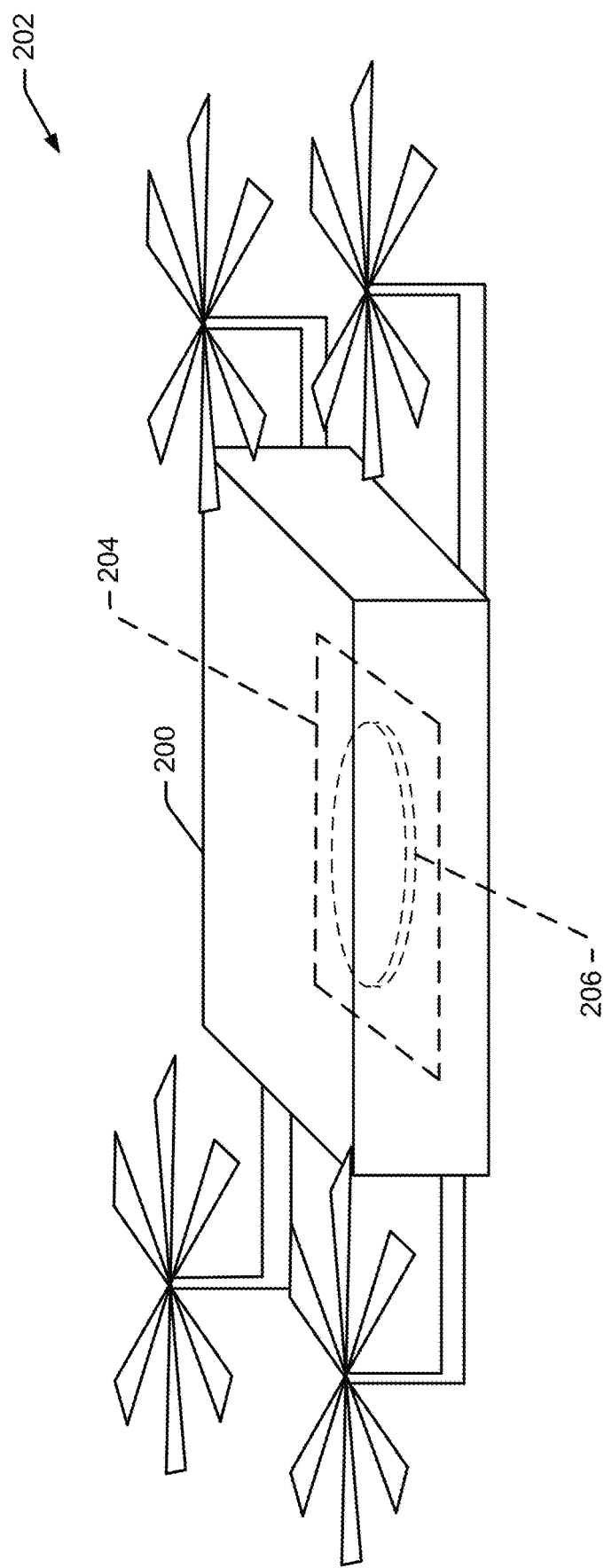
FIG. 2A is a perspective view of another example customized packaging created to facilitate a physical connection with a drone via docking or otherwise engaging a bottom of the package with a top of the drone.
Figure 2B:
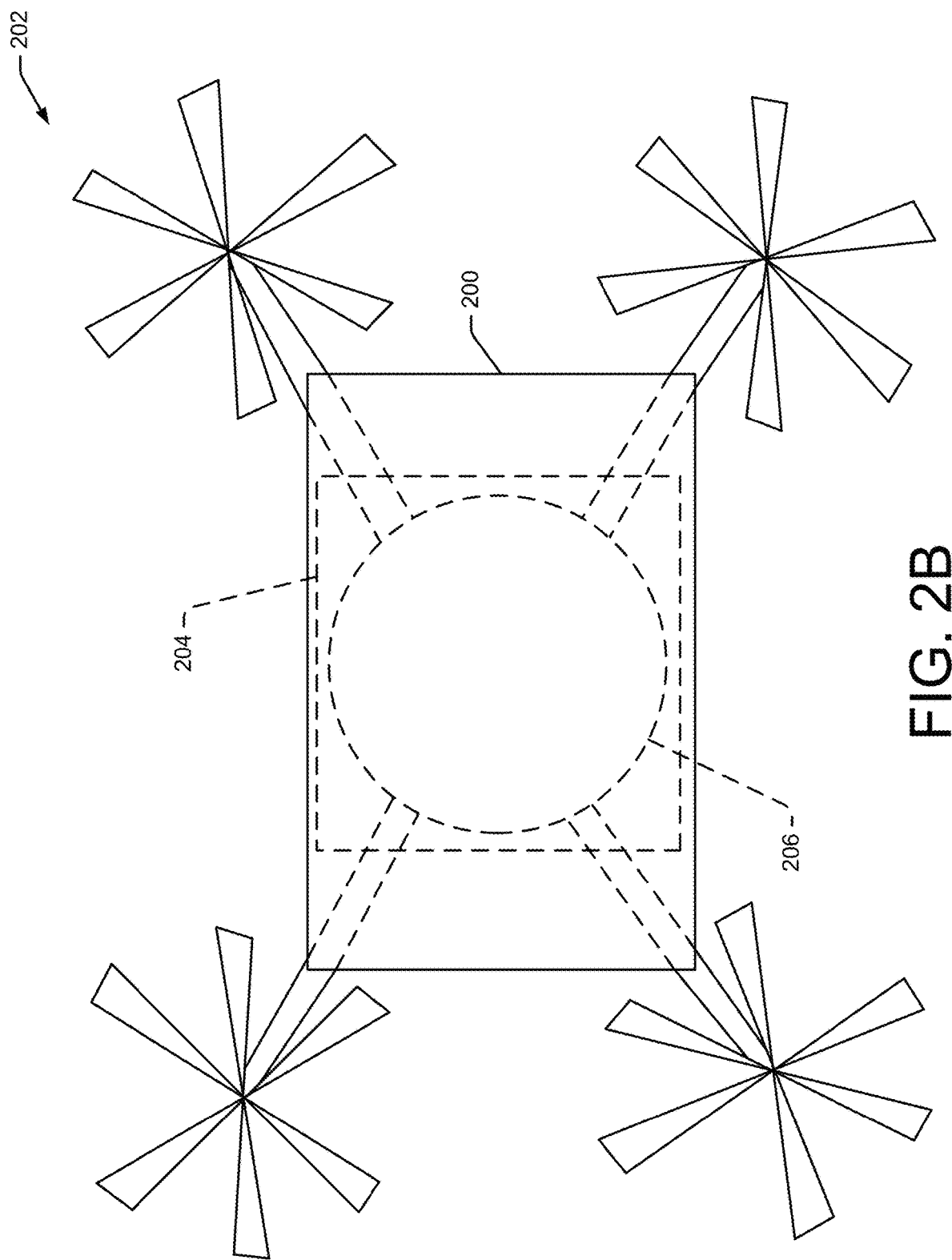
FIG. 2B is a top view of the example customized packaging of FIG. 2A coupled to a drone.

FIGS. 2A-2B illustrate another example in which customized packaging is generated (e.g., a 3D printed package (or simply "package") 200 is created to facilitate a physical connection with a drone 202. In this example, the package 200 may have a docking capability (e.g., an attachment mechanism) 204 on the bottom of the package 200 so as to be able to ride on the top of the drone 202. By way of example and not limitation, the attachment mechanism 204 may include one or more platforms, hooks, loops, pins, flanges, brackets, straps, notches, magnets, latches, threads, snap connectors, fasteners, snap connections, tongue and groove connections, twist connections, pneumatic connections, and/or other features designed to facilitate consistent and secure coupling of the package 200 to the drone 202. In some examples, the drone 202 may include one or more complimentary attachment mechanisms 206 on a top of the drone 202 to support, couple to, secure, or otherwise engage the attachment mechanism(s) 204 of the package 200. When included, the attachment mechanism(s) 206 of the drone 202 may include, by way of example and not limitation, one or more platforms, hooks, loops, pins, flanges, brackets, straps, notches, magnets, latches, threads, snap connectors, fasteners, snap connections, tongue and groove connections, twist connections, pneumatic connections, and/or other features designed to support, couple to, secure, or otherwise engage the attachment mechanism(s) 204 of the package 200.

FIGS. 3A-3D illustrate an example of customized packaging having a modular docking capacity, whereby one or more sides (or other portions) of a package 300A can be physically connected to a drone 302 or to other packages 300B, 300C, 300D, by one or more physical connections 304 allowing for configuration changes based on delivery method, drone model, integration with other packages or payloads, weather or other environmental conditions, etc. Packages 300A, 300B, 300C, and 300D are also referred to herein as packages 300, and each may be referred to generically as package 300. Each of the packages 300 may contain a separate payload composed of one or more items. In some examples, the physical connections 304 may have a feature located on the package 300 configured to engage or mate with a complementary mating feature of the drone 302 and/or other packages 300. Physical connections 304 may include, for example, interlocking features (e.g., puzzle pieces), hooks, loops, pins, flanges, brackets, straps, notches, magnets, latches, threads, snap connectors, fasteners, snap connections, tongue and groove connections, twist connections, pneumatic connections, or the like. The physical connections 304 may be integrated into the package, the drone, or both. In some examples, a package 300 may include physical connections 304 on multiple sides of the package 300. For instance, in the illustrated example, the package 300A includes physical connections 304 in the form of interlocking or tongue and groove connections on a first side to couple to package 300B and on a second side to couple to package 300D. Additionally, some or all of the packages 300A-300D may include a docking location 306 to the drone 302. The docking location 306 may include one or more physical connections 304 to couple to the drone 302. In the illustrated example, the physical connections 304 of the docking location 306 may include magnets and/or ferromagnetic material that can attract or be attracted by complimentary ferromagnetic material and/or magnets of the drone 302.

Figure 3A:
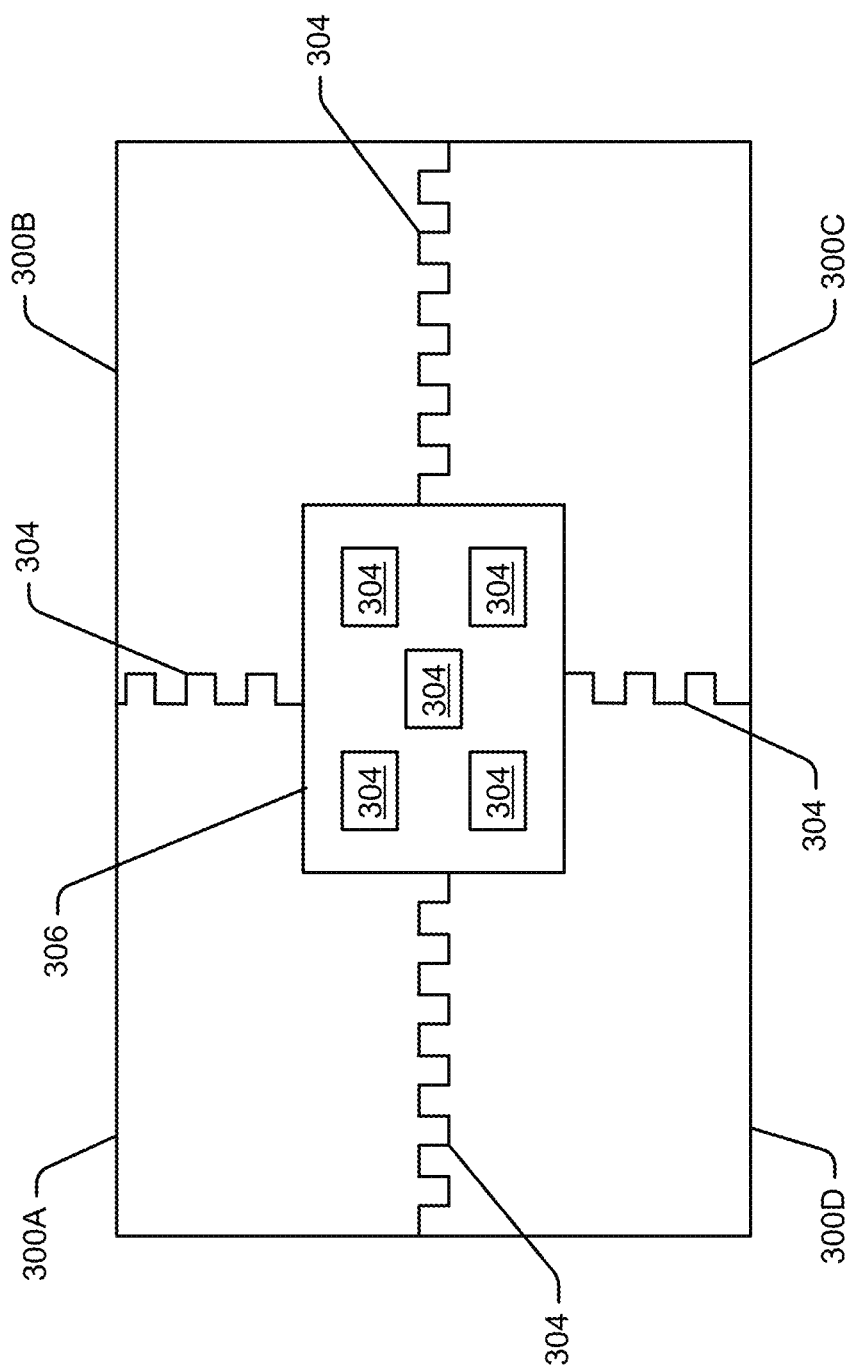
FIG. 3A is a top view of an example of customized packaging having a modular docking capacity, whereby one or more sides (or other portions) of a package can be physically connected to a drone and/or to other packages by one or more physical connections.
Figure 3B:
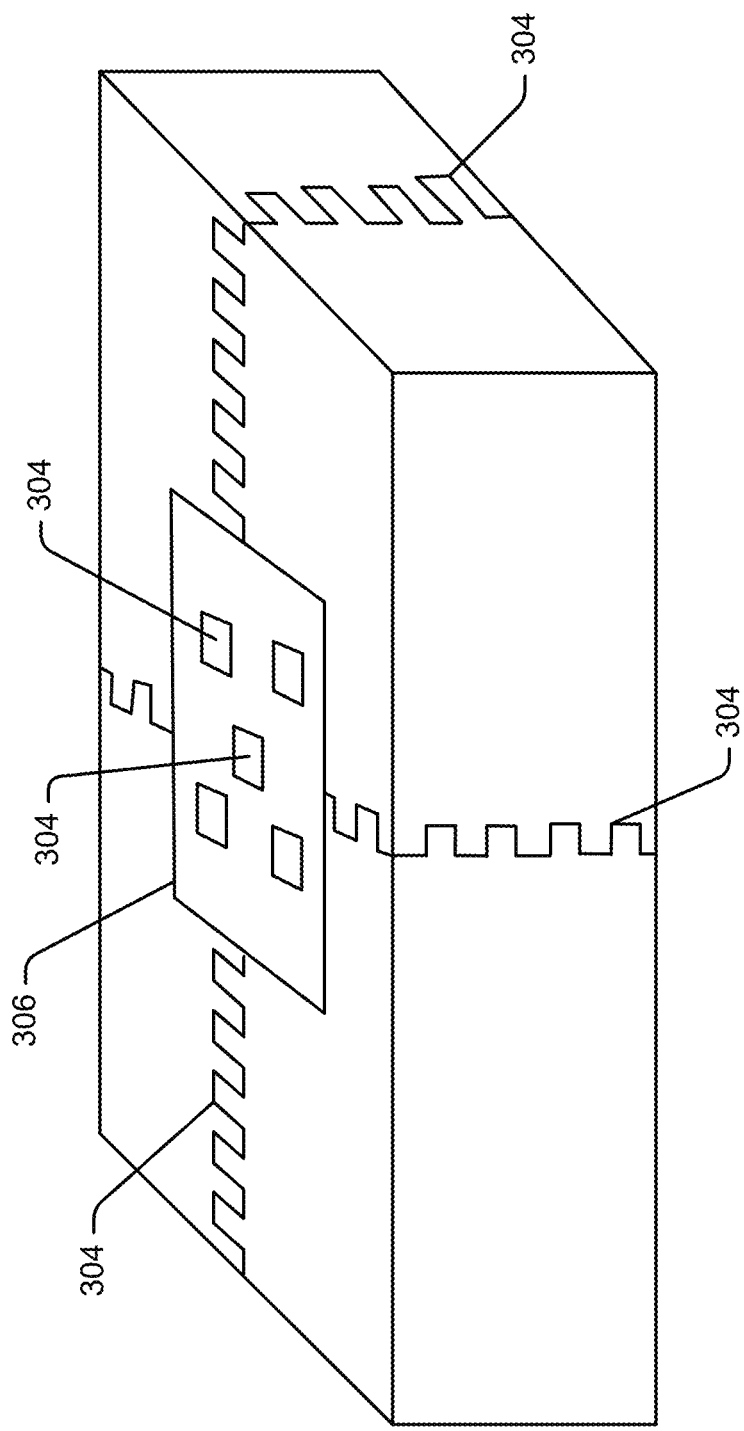
FIG. 3B is a perspective view of the example customized packaging of FIG. 3A.
Figure 3C:
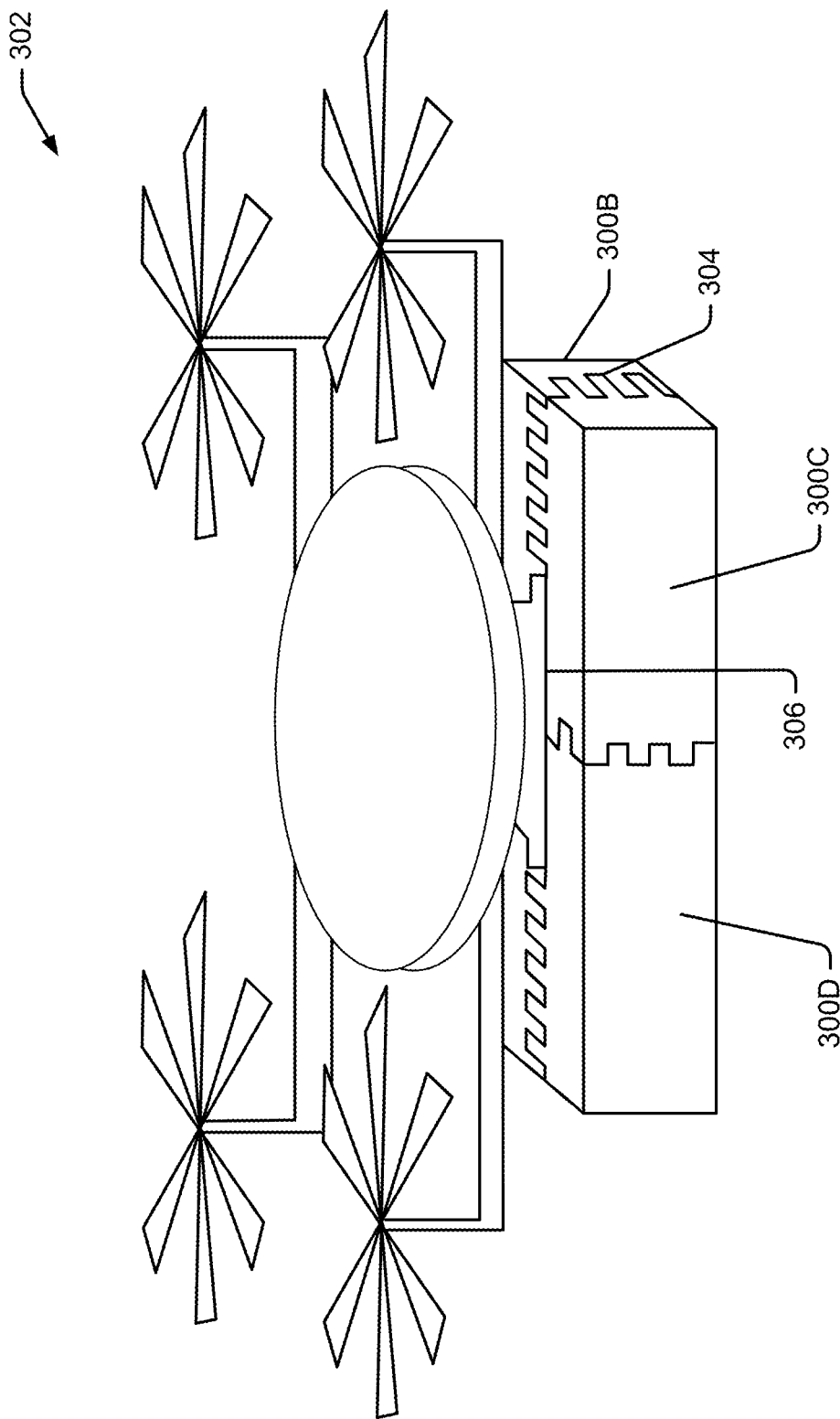
FIG. 3C is a perspective view of the example customized packaging of FIG. 3A coupled with a drone via docking or otherwise engaging a top of the package with an underside of the drone.
Figure 3D:
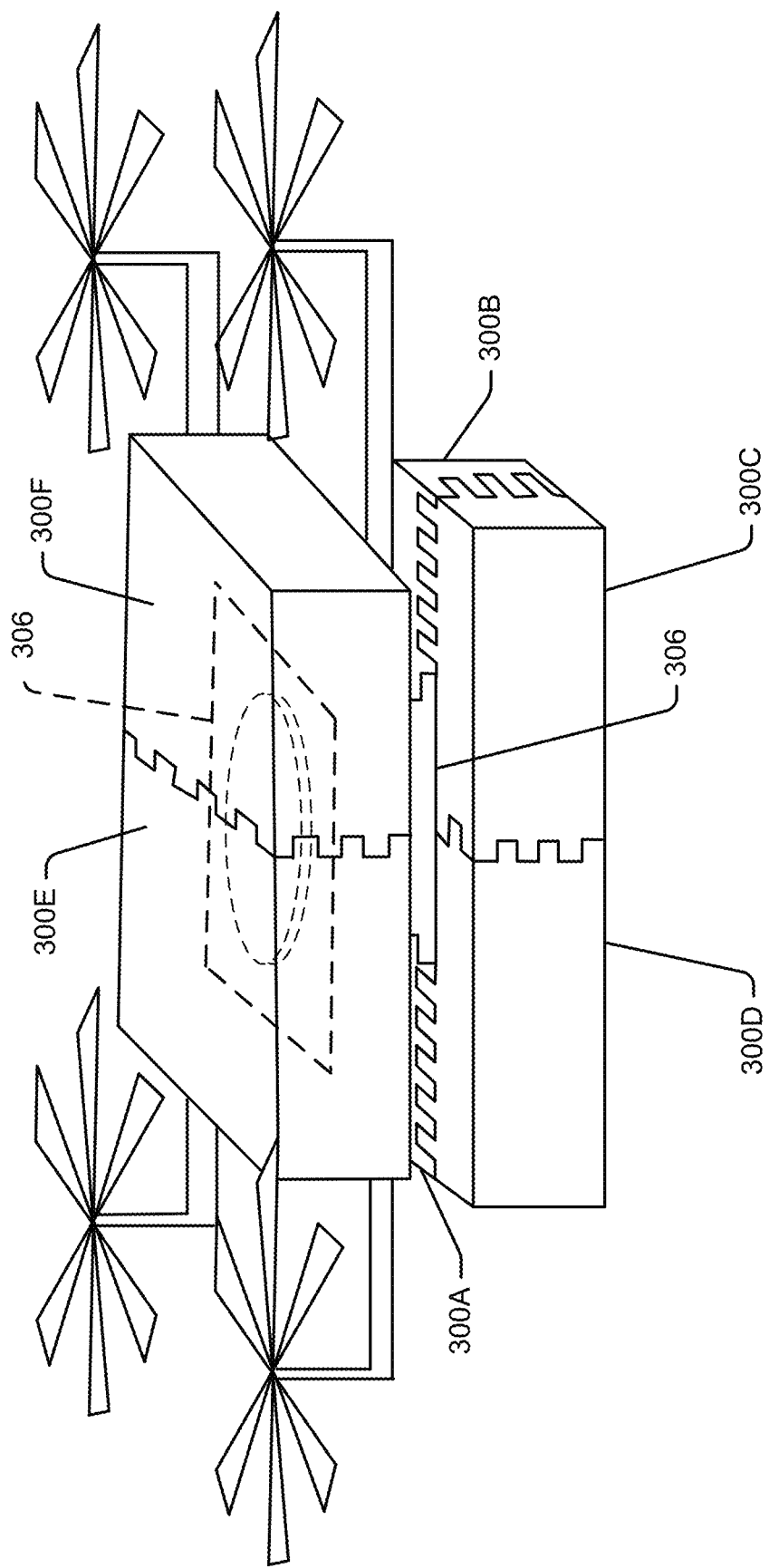
FIG. 3D is a perspective view of two example customized packages such as those of FIG. 3A coupled with a drone, with one package docking or otherwise engaging a top of the package with an underside of the drone, and a second package docking or otherwise engaging a bottom of the package with a top of the drone.

FIG. 3D illustrates an example in which multiple packages 300 are coupled above and below a drone 302 by physical connections 304 interposed between the respective packages 300 and upper and lower surfaces respectively of the drone 302. In this example, four interlocking packages 300A-300D are coupled below a body of the drone 302 at a first docking location 306 (shown in solid lines) and two interlocking packages 300E and 300F are coupled above the body of the drone 302 by a second docking location 306 (shown in dashed lines).

In the examples of FIG. 3A-3D, the docking locations 306 can include static connection capabilities, interlocking and disconnecting directly through external physical human or robotic intervention, or may include a remote release capability whereby the payload can be released by the drone 302, the drone operator, or through integration with the mobile device of the intended recipient—therefore allowing greater security and replacing today's "sign for" model of package delivery. By way of example and not limitation, the remote release mechanism may a selectively releasable magnetic coupling comprising an electromagnet in the drone 302 that can be selectively energized to secure the package(s) 300 and deenergized to release the package(s) 300, or a pneumatic pump or vacuum that can be selectively activated to pneumatically secure the package(s) 300 and deactivated to release the package(s) 300. The remote release mechanism may be activated or deactivated autonomously by the drone 302, by a wireless signal from a remote device controlled by a human operator, by a mobile device of an intended recipient of the package, or the like. In some examples, this remote release may be performed responsive to positively identifying the intended recipient of the package (e.g., by facial recognition, voice recognition, a password, a token or security dongle, or other authentication credential) by one or more sensors of drone 302 and/or package(s) 300. This integrated release method can prevent packages from being opened, examined, or adulterated before being reaching the intended recipient. Delivery locations can also include secure facilities, e.g., fenced yards, delivery "boxes" similar to mail boxes which will open only to receive packages or for the recipient to retrieve packages. Similarly, docking locations may be in "common" areas, such as apartment, condo, or permanent or temporary (hotel, airport, etc.) storage locations which may then be opened by the intended recipient.

Other tamper-evident components can be included in 3D printed packaging, such as packages 300, to ensure that the payload reaches its destination intact. Integrated sensors (temperature, humidity, accelerometers, torsion, light exposure, etc.) can be included in the packaging to ensure that medical equipment remains sterile, that sand and other environmental contaminants do not reach critical replacement parts, that consumable goods are still safe to consume, or that sensitive electronics were not damaged when the drone 302 released them. Location-based sensors can detect and report on routing, determining that packages were not diverted en route, and also ensuring that route-based pricing may be used as applicable.

Because the size, type, design, and functionality of drones or other vehicles varies, so too may the packaging integration. For example, very small payloads like a dose of medicine may be packaged in such a way as to allow a miniature drone vehicle to deliver them using very little energy or covering a great distance. Some elements that enable this include creating an aerodynamic, hydrodynamic, or otherwise beneficial shape in the packaging that surrounds the payload to reduce drag and otherwise support efficient function. The size, shape, and configuration of the package may be customized and printed specifically for the payload based at least in part on the size, shape, and configuration of the payload, a fragility of the payload, and/or other characteristics of the payload.

FIGS. 4A-4D illustrate example packaging that is flat or disc-shaped (FIG. 4A), wing-shaped (FIG. 4B), cone shaped (FIG. 4C), and composite or "multi-shaped" (FIG. 4D) to increase delivery efficiency, range, performance, or the like. Any of the packages shown in FIGS. 4A-4D may be coupled to and transported by a drone using any of the techniques described herein or other techniques.

Figure 4A:
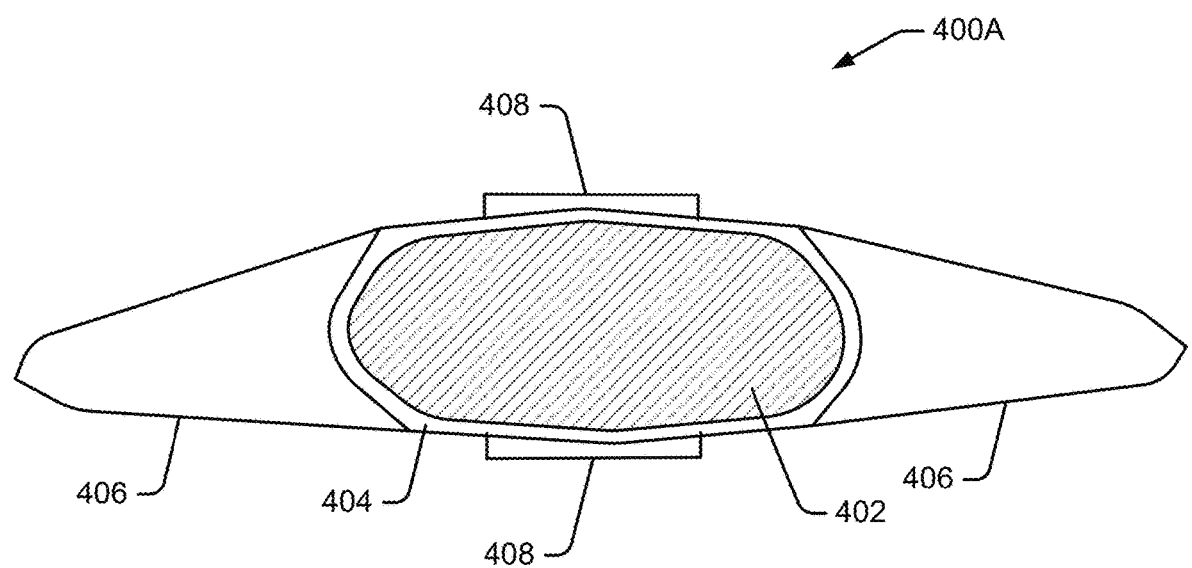
FIG. 4A illustrates an example package 400A, having a flat cross section.

FIG. 4A illustrates an example package 400A, having a flat cross section. The package 400A may comprise a flat, elongated pouch, a generally circular disk shape, an oblong disk, or the like. The relatively flat profile of the package in this example may provide relatively low air resistance on a drone carrying the package and/or may stack compactly with other packages in a cargo bay of a drone. The package 400A comprises a payload area 402 containing one or more items, a shell or housing 404 surrounding the payload area 402, and one or more aerodynamic packaging portions 406. The one or more items may be held loosely within the payload area 402 or may be at least partially encapsulated or surrounded by packing material in the payload area 402. In some examples, the packing material, the shell or housing 404, and/or the aerodynamic packaging portions 406 may be printed at around the one or more items by one or more 3D printers according to a package model generated based at least in part on the size, shape, and configuration of the one or more items comprising the payload, a fragility of the one or more items comprising the payload, and/or other characteristics of the one or more items comprising the payload. The package 400A also includes one or more docking locations 408, which are integrated with or coupled to the shell or housing 404 and/or the aerodynamic packaging portions 406. The docking locations 408 may comprise any of the physical connections (such as physical connections 304) or other structures described herein for coupling the package 400A with a drone and/or one or more other packages in a stacked configuration. In some examples, the docking location(s) 408 may be 3D printed along with other portions of the package 400A according to the package model.

Figure 4B:
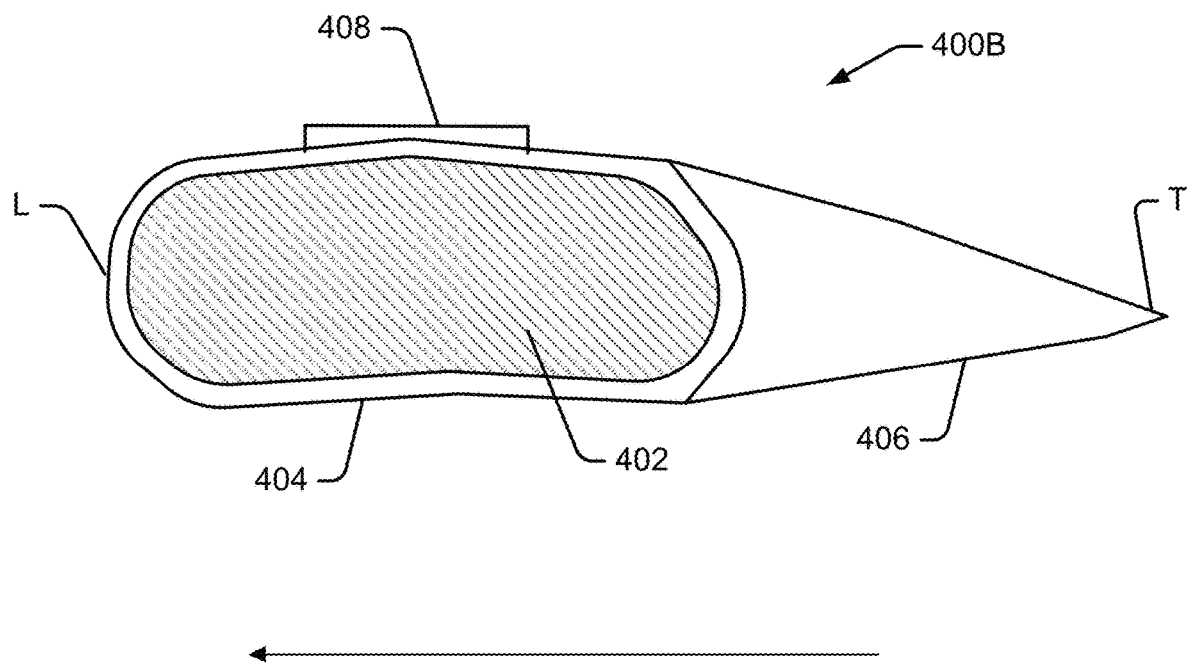
FIG. 4B illustrates an example package 400B, having a wing shaped cross section.

FIG. 4B illustrates an example package 400B, having a wing shaped cross section having a leading edge (L) and a trailing edge (T). The package 400B may taper from a proximal end (out of the page) to a distal end (into the page) like the wing of an aircraft, such that a cross sectional area of the package 400B may decrease from the proximal end to the distal end. The wing shape of the package in this example may not only provide relatively low air resistance on a drone carrying the package, but may also provide lift to the drone when traveling in a direction shown by the arrow in FIG. 4B, further reducing energy requirements for the drone to transport the package 400B. The package 400B comprises a payload area 402 containing one or more items, a shell or housing 404 surrounding the payload area 402, and one or more aerodynamic packaging portions 406. The one or more items may be held loosely within the payload area 402 or may be at least partially encapsulated or surrounded by packing material in the payload area 402. In some examples, the packing material, the shell or housing 404, and/or the aerodynamic packaging portions 406 may be printed at around the one or more items by one or more 3D printers according to a package model generated based at least in part on the size, shape, and configuration of the one or more items comprising the payload, a fragility of the one or more items comprising the payload, and/or other characteristics of the one or more items comprising the payload. The package 400B also includes one or more docking locations 408, which are integrated with or coupled to the shell or housing 404 and/or the aerodynamic packaging portions 406. The docking locations 408 may comprise any of the physical connections (such as physical connections 304) or other structures described herein for coupling the package 400B with a drone. While package 400B is shown having a single docking location 408 on a top surface thereof, in other examples, the package 400B may have one or more multiple docking locations on top, bottom, distal, and/or proximal surfaces of the package 400B. In some examples, the docking location(s) 408 may be 3D printed along with other portions of the package 400B according to the package model.

Figure 4C:
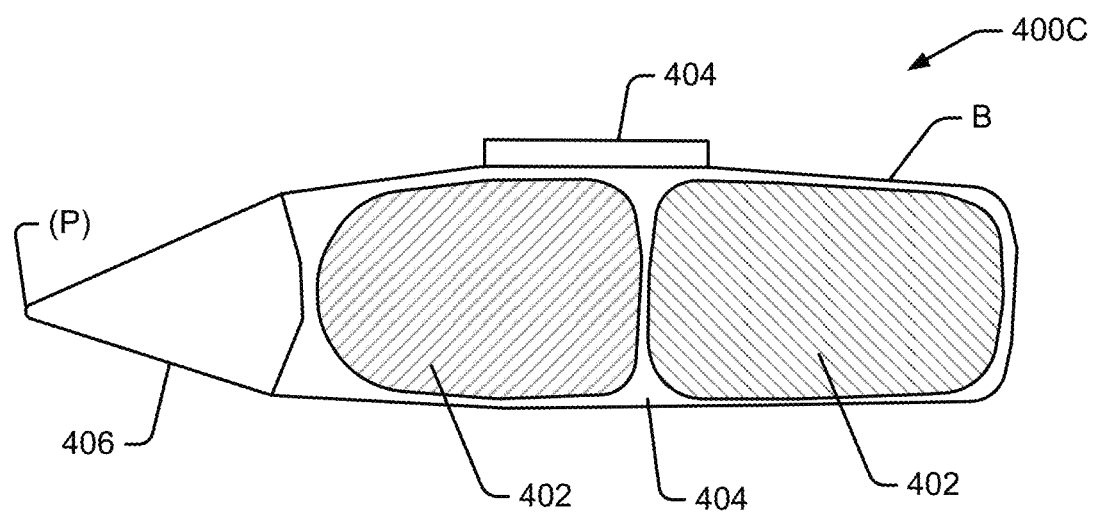
FIG. 4C illustrates an example package 400C, having an elongated, pointed cross section.

FIG. 4C illustrates an example package 400C, having an elongated, pointed cross section. This cross section may result in a package having a cylindrical or rectangular prismatic body (B) with a conical or pyramidal point (P). In examples in which the package 400C has a rectangular prismatic body (B) the package may have a length (extending into and out of the page) sized and shaped to fit one or more items of the payload. The relatively flat profile of the package in this example may provide relatively low air resistance on a drone carrying the package and/or may stack compactly with other packages in a cargo bay of a drone. Additionally, in some examples, the package 400B may be designed to be airdropped from a drone and to drop substantially vertically to the ground. The point (P) of the package may include damping material and/or one or more crumple zones and be designed to absorb impact of the package 400C impacting the ground. The package 400C in this example comprises multiple payload areas 402, each containing one or more items, a shell or housing 404 surrounding the payload areas 402, and one or more aerodynamic packaging portions 406. The one or more items may be held loosely within the payload areas 402 or may be at least partially encapsulated or surrounded by packing material in the payload area 402. In some examples, the packing material, the shell or housing 404, and/or the aerodynamic packaging portions 406 may be printed at around the one or more items by one or more 3D printers according to a package model generated based at least in part on the size, shape, and configuration of the one or more items comprising the payload, a fragility of the one or more items comprising the payload, and/or other characteristics of the one or more items comprising the payload. The package 400C also includes one or more docking locations 408, which are integrated with or coupled to the shell or housing 404 and/or the aerodynamic packaging portions 406. The docking locations 408 may comprise any of the physical connections (such as physical connections 304) or other structures described herein for coupling the package 400C with a drone. While package 400C is shown having a single docking location 408 on a top surface thereof, in other examples, the package 400C may have one or more multiple docking locations on top, bottom, distal, and/or proximal surfaces of the package 400C. In some examples, the docking location(s) 408 may be 3D printed along with other portions of the package 400C according to the package model.

Figure 4D:
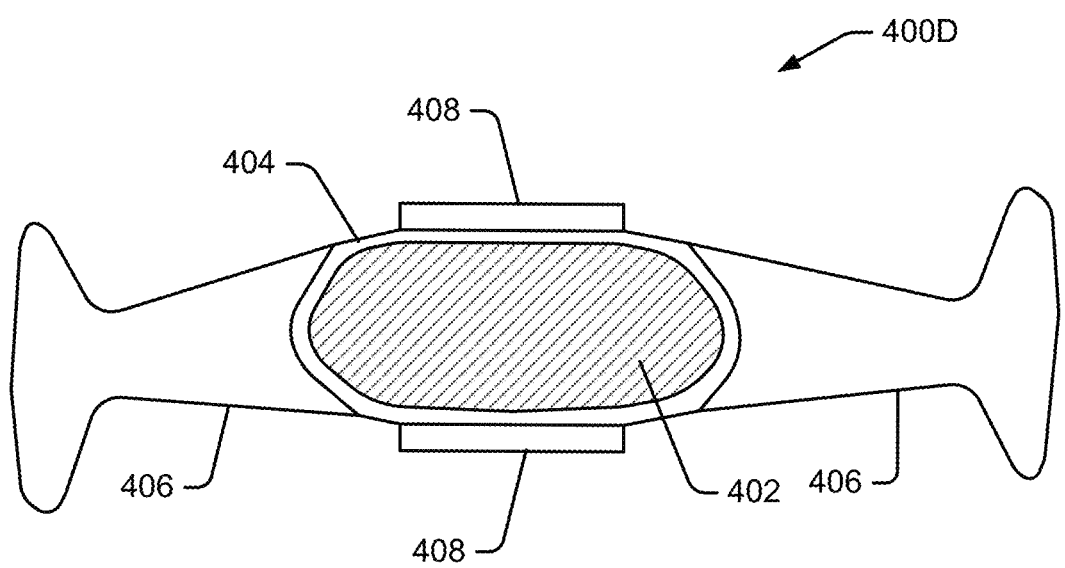
FIG. 4D illustrates an example package 400C, having a generally I-beam shaped cross section.

FIG. 4D illustrates an example package 400C, having a generally I-beam shaped cross section. The package 400D is similar to the package 400A of FIG. 4A, except for the shape of the aerodynamic packaging portions 406 which may have vertical winglet features extending from the outer edges. As in the case of package 400A, the package 400C may comprise an elongated package extending into and out of the page, or may comprise a generally circular or oval shape by rotating the cross section about a central axis parallel to the long dimension of the page. The package 400D also includes one or more docking locations 408, which are integrated with or coupled to the shell or housing 404 and/or the aerodynamic packaging portions 406. The docking locations 408 may comprise any of the physical connections (such as physical connections 304) or other structures described herein for coupling the package 400A with a drone and/or one or more other packages in a stacked configuration. In some examples, the docking location(s) 408 may be 3D printed along with other portions of the package 400A according to the package model.

Details of the packing materials and the 3D printing processes described herein can be found in U.S. Pat. No. 9,248,611, to Divine et al., which is incorporated herein by reference.

In any of the examples described herein, layers of 3D printed packaging can be utilized to add various features to the payload. In one example, a tamper evident package is created around packaging that is a sterile environment. In another example, aerodynamic packaging is added around packaging that requires electronic authentication to be released and may then drop or glide to a destination. In yet another example, different components are packaged together as a unit, but are packaged individually within a single larger payload package, all of which is 3D printed. The packaging can have features including access for one or more components, to release one or more items to an individual recipient, or into a secure delivery location as detailed above. Sensors included in, coupled to, or otherwise associated with the package can report on delivered individual items, tampering with other non-delivered items, or even locate items in the event of theft or misdelivery.

In customizing the packaging shape to facilitate easier delivery via drone or other UAV, it is possible to create the UAV out of the packaging itself.

Figure 5A:
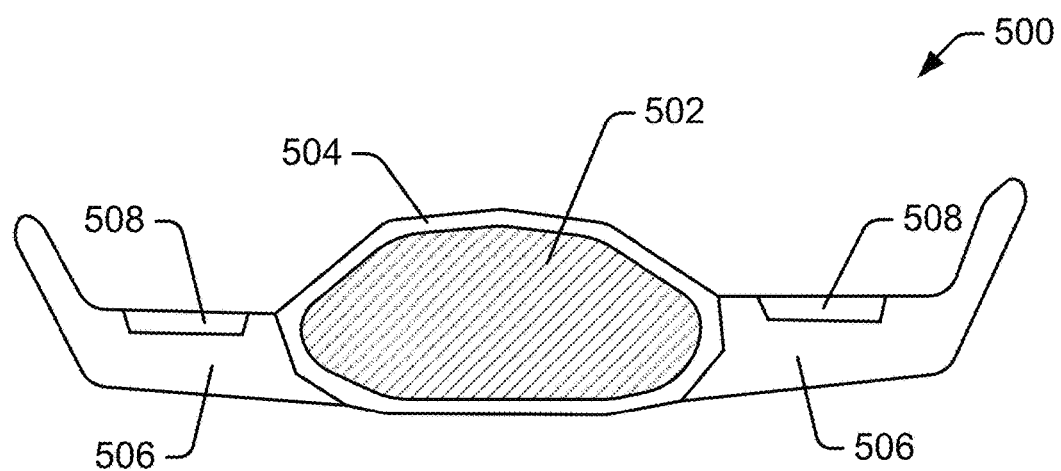
FIG. 5A is a front view of an example drone that is itself a package capable of gliding to a final destination.
Figure 5B:
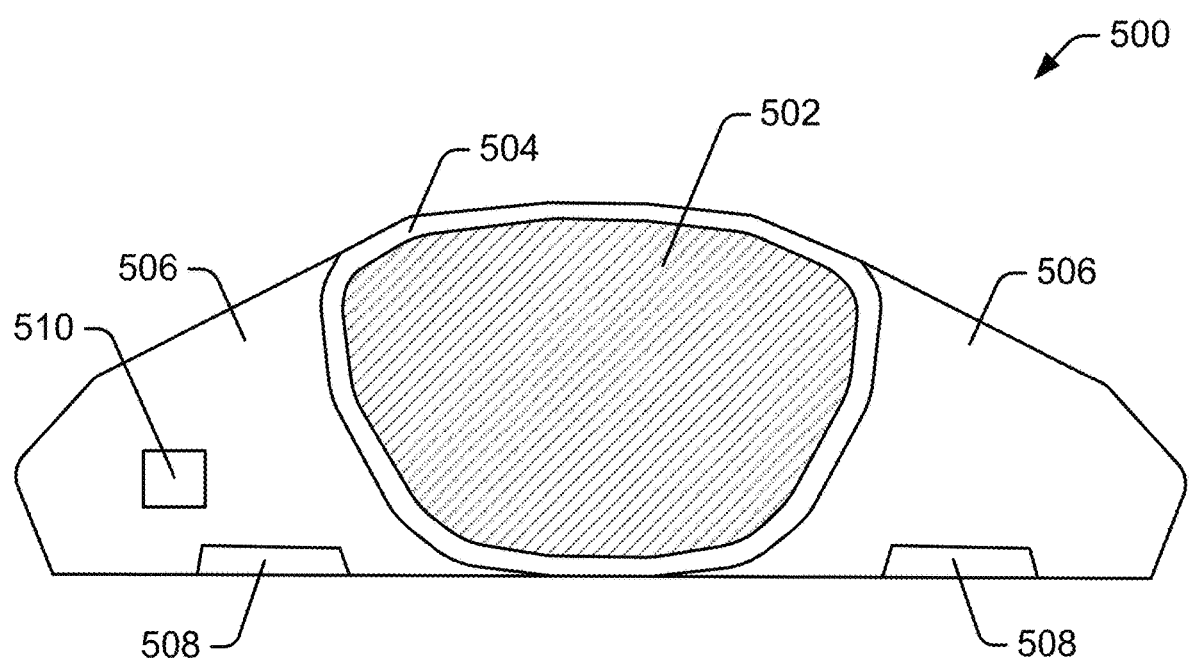
FIG. 5B is a top view of the example drone of FIG. 5A.

FIGS. 5A and 5B illustrate one example in which an entire UAV 500 capable of gliding to the final destination can be created by printing a payload area 502, a frame or shell 504 at least partially surrounding the payload area 502, some or all of a fuselage (which may be comprised of the payload area 502 and the frame or shell 504), wings 506, tail and/or flaps (not included in this example), sensors (GPS, altimeter, wireless transmitter/receiver, controller, etc.) 510, and/or other required components around the payload. In that case, the UAV 500 itself is the package. In some examples, a power source (e.g., battery, fuel cell, flywheel, spring, motor, rocket engine, turbine, etc.), actuators, electronics, and the like may be assembled to the UAV 500 after it is printed. However, in other examples, at least portions of the power source (e.g., motor mounts, propellant tanks, fuel tanks, rocket nozzles, etc.), actuators (e.g., connecting rods, shape linear actuators, gears, etc.), and/or electronics (e.g., circuit traces, coils, heat sinks, inductors, anodes, cathodes, and/or other circuit elements, etc.) may be 3D printed in plastic, metal, or other materials as part of the package.

Figure 6A:
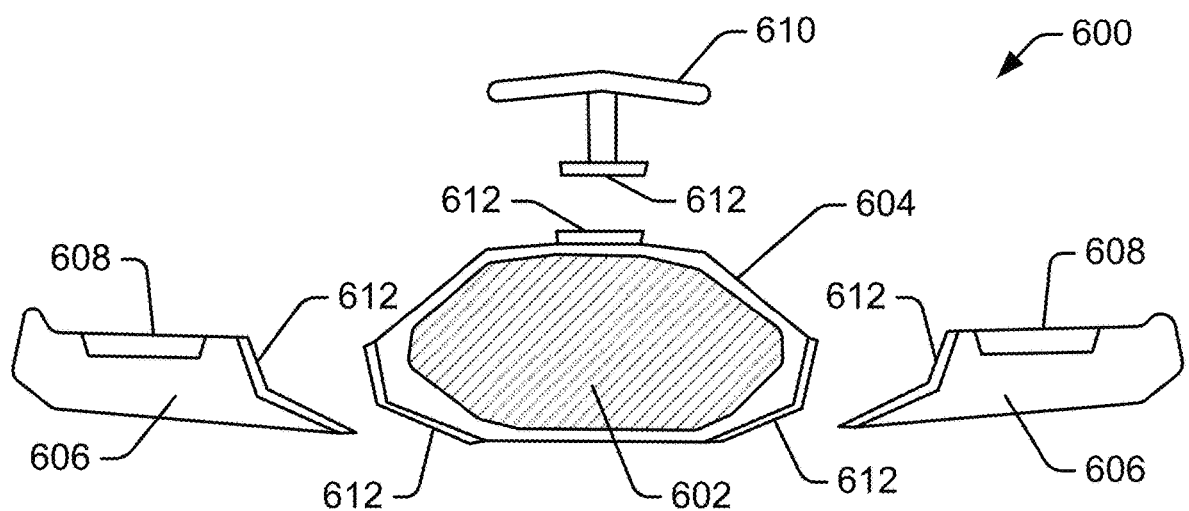
FIG. 6A is a front view of an example package that is configured as a fuselage of a drone that is capable of being coupled with premanufactured wings and tail so as to glide to a final destination.
Figure 6B:
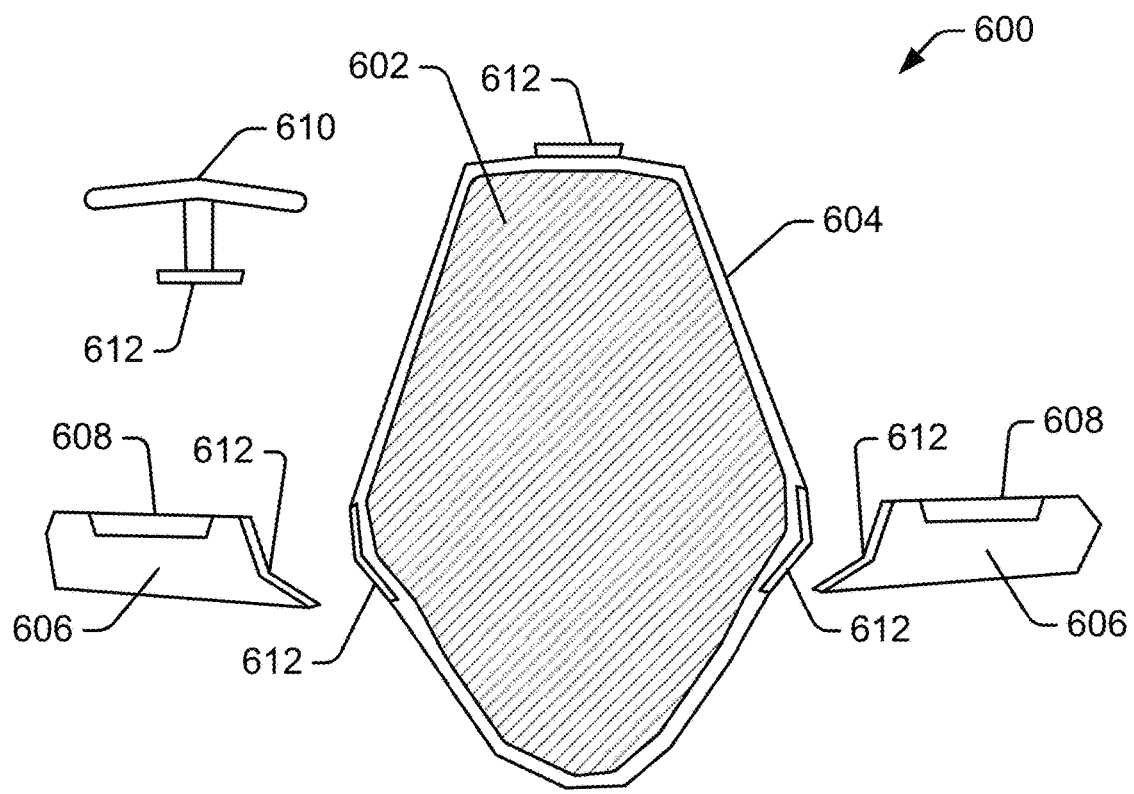
FIG. 6B is a top view of the example package of FIG. 6A.

FIGS. 6A and 6B illustrate another example in which a package forms at least a portion of a drone 600. In particular, a payload area 602 is surrounded by a frame or shell 604 which forms a fuselage of the drone 600. Wings 606 (including flaps 608) and tail 610 in this example can be traditionally manufactured—and then attached to the fuselage 602, 604 manually or by 3D printing connective parts— which is itself customized 3D printed packaging around the payload. The wings 606 and tail 610 can be pre-made in various sizes, but utilize a common interlocking system, so as to be rapidly assembled to customized fuselages 602, 604 custom printed for the payload they are designed to carry, and deployed based on the payload.

In some examples, the drone/package 600 may be modeled so as to achieve uniform and/or optimal balance of the aircraft. For example, if a drone is to transport a payload that is weighted more heavily on a first side than on a second side, the drone/package 600 may include extra material (e.g., 3D printed material) on the second side to counterbalance the heavier load on the first side of the aircraft. Additionally or alternatively, the packaging model may determine the optimal placement of a payload within the finished drone/aircraft and may print the aircraft/package around the item accordingly. Various scanning, weighing, or measuring apparatus may be employed to determine the optimal or required design, or detailed specifications accessible to the package and/or drone printer may be used to determine the required printing characteristics for the package and/or drone.

Additionally, other arrangements are possible when creating a UAV or drone out of 3D printed packaging surrounding a payload.

Figure 7:
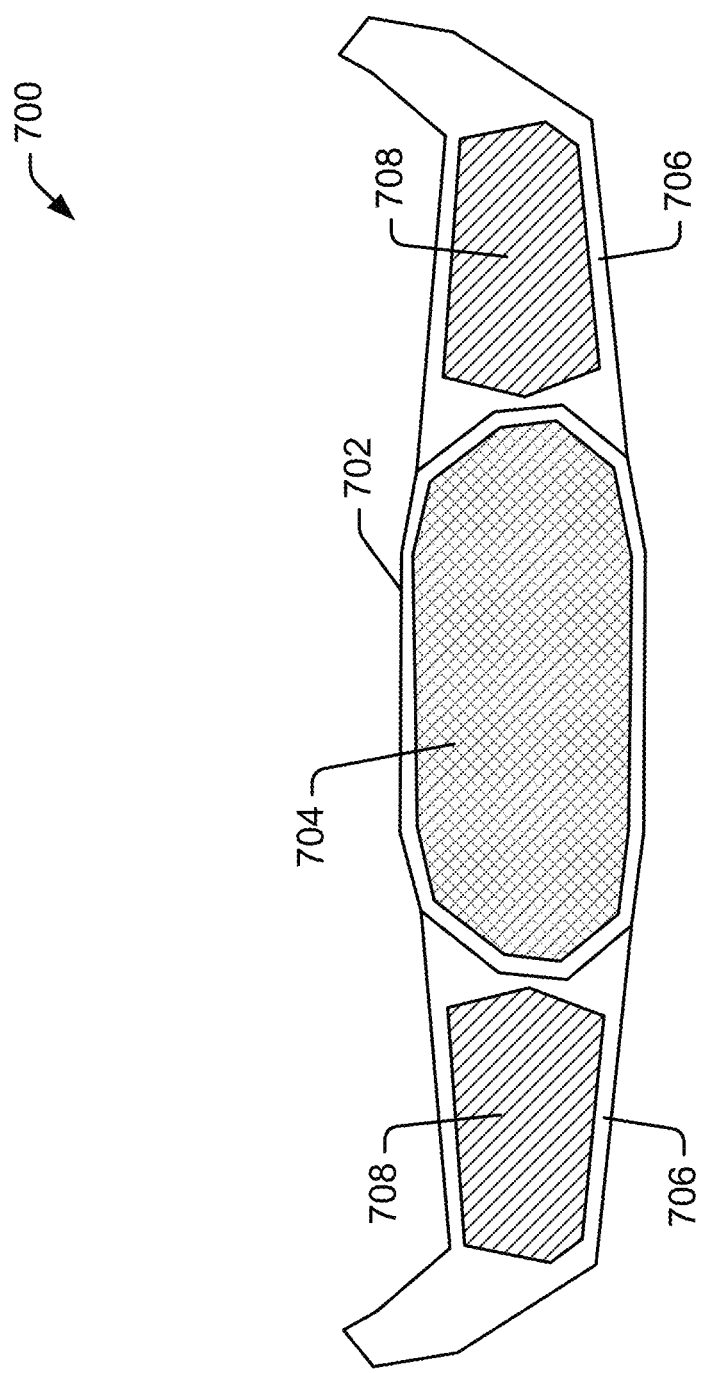
FIG. 7 illustrates an example drone in which the fuselage can contain a larger payload, while wings may contain longer or otherwise compatible payloads or component pieces of the final payload.

FIG. 7 illustrates one example drone 700 in which the fuselage 702 can contain a larger payload 704, while wings 706 may contain longer or otherwise compatible payloads 708 or component pieces of the final payload that are released from the packaging upon delivery and assembled together with the contents of the other wing and fuselage. In yet another example, the component pieces of the drone could be made up of packaging for payloads with different requirements. For example, the payloads 708 contained in the wings 706 may require a sterile environment, but no additional support structure or padding, but the payload 704 contained in the fuselage 702 may require additional support structures and padding but not a sterile environment. It is possible to print yet another environment into the other wing of the UAV (humidity controlled, for example) to deliver multiple different payloads having different requirements in a single vehicle.

Because these payloads may be capable of gliding under the influence of gravity and/or their own power, they can be launched from a multitude of platforms—including airplanes, larger gliders, satellites, blimps, balloons, helicopters, larger drones, or other airborne platforms. In fact, these payloads and the glider packaging can both be manufactured while in-flight in the larger airborne platforms, allowing the creation of a "flying factory" where items are printed en route, and the packaging that allows it to glide safely to delivery is also added prior to reaching the "drop point." This would allow for an on-demand delivery system with enormous range and incredible speed relative to traditional manufacturing, shipping, and logistics models.

While the techniques described above are described in the context of a UAV or drone, the techniques are also applicable to land vehicles and water vehicles. Moreover, while the techniques are described in the context of autonomous vehicles, the techniques are equally as applicable to manually operated, remotely operated, and/or partially autonomous vehicles. By way of example and not limitation, the techniques described herein may be used to print packages for integration with or transport by box truck, semi-truck, shipping container, or the like. In some examples, the "box" of the semi-trailer, box truck, or shipping container may be completely or partially printed by a 3D printing system. In some examples, attachment features (e.g., ISO blocks, pallets, brackets, rails, tracks, etc.) may be printed onto the 3D printed packages. Additionally, printed packages may allow changes in mode of transportation and delivery, with various attachment and features being printed and accessible on the package by manipulation of the package, or discarded as the mode of transportation changes, e.g., a wing may be discarded when an item shifts to a land-based transportation system, or an attachment point on the top may be used instead of an attachment point pre-printed on the bottom for the second mode of transportation.

Because each delivery vehicle can custom 3D printed on a per-payload basis, extensive customization options exist. Pictures of the contents could be printed on the package for potential recipients, or instructions in multiple languages tailored to the local population. Other optional customization includes directions for use or assembly of the contents, instructions for disposal of the drone materials, or other useful information.

Figure 8:
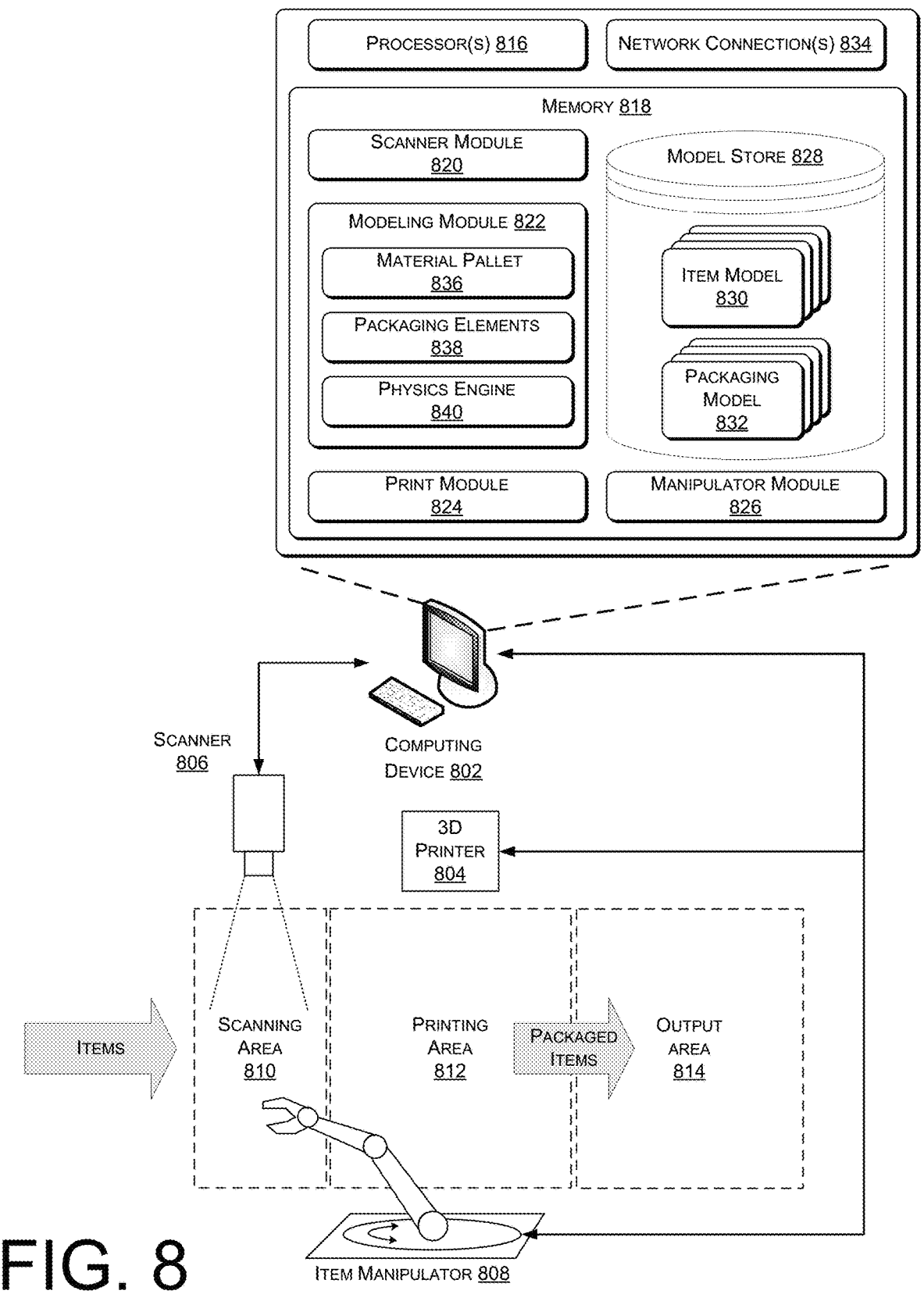
FIG. 8 is a schematic diagram of an example system usable to package items using 3D printing, including generating the drone packaging described herein.

FIG. 8 illustrates an example system 800 usable to implement 3D printed packaging of items. The system 800 may be usable to package items as a payload for delivery by a drone according to the examples and techniques described herein.

As shown in FIG. 8, system 800 includes a computing device 802 in communication with a 3D printer 804. In the illustrated example, the system 800 also includes a scanner 806 and an item manipulator 808. However, in other examples, the scanner and/or manipulator may be omitted or combined with each other, the 3D printer 804, and/or computing device 802. When present, the scanner 806 may comprise a 3D optical scanner, a 3D laser scanner, and/or one or more cameras to obtain information about an item, such as its visual appearance, outer dimensions, or the like. Numerous different scanners are available, such as, for example, the exaCT-s® CT Workstation or the Shapetracer Laser Line Scanner, both available from Wenzel America of Wixom, Mich., or the Artec Spikder, Artec L, or Artec EVA 3D Scanners available from Artec Group of Palo Alto, Calif. In some examples, the scanner 806 may additionally or alternatively comprise an ultrasound scanner, an x-ray scanner, a spectrometer, a scale, and/or other scanning or sensing equipment to determine interior characteristics of the item, materials from which the item is made, weight of the item, volume of the item, density of the item, and the like.

In some examples, the computing device 804 may "recognize" the item based on the scan. The computing device 804 may recognize the item by, for example, reading a product identifier (e.g., universal product code or "UPC", model number, serial number, bar code, quick response code, or other identifier) of the item (if available), and then query a product catalog, model store, or other database to obtain additional information about the item. The computing device 802 may additionally or alternatively recognize the item using object recognition (e.g., by comparing the scan or a vector representation of the scan to a database of reference scans or images of items). Once an item is recognized, the computing device 804 may obtain additional information about the item such as a computer model of the item, a textual description of the item, product reviews of the item, human input information about the item, web pages related to the item, or any other available information about the item.

The item manipulator 808 may comprise a robotic arm or other computer-controlled manipulator. In some examples, the item manipulator 808 may be specialized to move the item within the system 800. For instance, the item manipulator 808 may include specialized hardware (e.g., item engaging tools designed specifically for a particular type or shape of item) and/or software (e.g., customized code for a particular operation or set of operations). In that case the item manipulator 808 may be capable of limited and/or predetermined motions. However, in other examples the item manipulator 808 may comprise a robotic arm with a configurable or articulatable item-engaging tool or other manipulator having multiple degrees of freedom and capable of a wide range of motion. Numerous different manipulators are available depending on the specific tasks to be performed. In one specific example, the item manipulator 808 may be a six-axis robotic arm, such as the Adapt Viper line of robotic arms available from Adept Technology, Inc. of Pleasanton, Calif. In some embodiments, the item manipulator 808 may additionally or alternatively comprise a conveyor belt, rollers, or other mechanisms to move items from one location and/or orientation to another.

The computing device 802, 3D printer 804, scanner 806, and/or item manipulator 808 are in communication with one another over a wired and/or wireless network. The network of system 800 may be further connected to one or more other local and/or wide area networks, such as the Internet.

When an item is received, the item may be placed in a scanning area 810, where the item may be scanned by the scanner 806 to determine the nature of the item. Once the item has been scanned and the system 800 has determined the nature of the item to be packaged, the item may be moved to a printing area 812 where the item will be packaged. The item may be packaged alone or with one or more other items (e.g., other items that are part of a same order and/or are to be shipped to the same location). Once the item(s) are packaged, the packaged item(s) may be output to an output area 814 for storage, shipping, and/or further processing. The following description describes the process of packaging a single item. However, it should be understood that the process may also be used to print packaging for/around multiple items.

The computing device 802 comprises one or more processors 816 and memory 818. The processor(s) 816 may comprise one or more microprocessors (e.g., central processing units, graphics processing units, etc.), each having one or more processing cores, one or more microcontrollers, or the like. The memory 818 may be configured to store one or more software and/or firmware modules, which are executable by the processor(s) 816 to implement various functions. While the modules are described herein as being software and/or firmware executable by one or more processors, in other embodiments, any or all of the modules or functional blocks may be implemented in whole or in part by hardware (e.g., as an application specific integrated circuit or "ASIC," a specialized processing unit, a field programmable gate array or "FPGA," etc.) to execute the described functions. The memory 818 may comprise computer-readable media and/or devices and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors or circuits of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media includes hardware and does not include modulated data signals or carrier waves.

Referring back to FIG. 8, the memory 818 includes a scanner module 820, a modeling module 822, a print module 824, and manipulator module 826, and a model store 828. The scanner module 820 may provide an interface (e.g., driver, application programming interface or "API," or the like) to the scanner 806. For instance the scanner module 820 may provide commands to control the scanner 806 to obtain information about the item. The scanner module 820 may additionally receive the output of scanner 806 (i.e., the scanned image(s) or sensor data captured by the scanner 806). From the output of the scanner 806, the scanner module is able to generate an item model 830 (if one did not already exist) or may select and/or supplement an existing item model 830 (if one already exists). Once generated, selected, and/or supplemented, the item model 830 may be stored in the model store 828 or other repository for subsequent access by local and/or remote computing devices.

The modeling module 822 generates a computer model of the packaging that is to be applied to the item. In other words, the modeling module 822 determines the geometry and layout of the package that should be used to package the item, taking into account the item model 830. The modeling module 822 generates a packaging model 832 describing the geometry layout of the package. The packaging model 832 may be stored in the model store 828. While the item models and packaging models are both shown as being stored in model store 828 in this example, in other examples the item models and packaging models may be stored separately in memory 818 or at one or more other data stores in communication with the computing device 802. The modeling module 822 may be a stand alone module, or may be a part of, an add-on to, or may otherwise integrate with, a 3D modeling program such as SolidWorks available from Dassault Systèmes SolidWorks Corp. of Waltham, Mass., Pro-Engineer available from PTC of Needham, Mass., or the like.

Print module 824 may provide an interface (e.g., driver, application programming interface or "API," or the like) between the computing device 802 and the 3D printer 804. For example, the print module 824 may include a printer driver and may provide commands controlling a print head of the 3D printer. Print module 824 may control the 3D printer 804 to generate packaging for the item according to packaging model 832. The print module 824 may control, among other things, the material or materials from which the package is to be printed, print speed of a print head of the 3D printer 804, size and shape of packing material and/or an outer surface or shell of the package.

The manipulator module 826 may provide an interface (e.g., driver, application programming interface or "API," or the like) between the computing device 802 and the item manipulator 808. For example, the manipulator module 826 may be usable by the computing device 802 to direct the item manipulator 808 to move the item before, during and/or after printing the package. For instance, the manipulator module 826 may direct the item manipulator to place the item into the scanning area 810, to rotate or otherwise move the object in the scanning area 810, to move the object from the scanning area 810 into the printing area 812, to rotate or otherwise move the object in the printing area 812, and/or to remove the item from the printing area 812.

The computing device 802 also includes one or more network connections 834 to connect the computing device 802 to the other devices in the system 800, as well as to one or more other local and/or wide area networks. In some examples, the network connections 834 may allow a user, such as a purchaser of an item, to specify how the item is to be packaged for shipping to the purchaser or another intended recipient.

The memory 818 may also include an instance of a distributed ledger (not shown), which may store a record of items packaged by the system, packages printed by the system, customers that purchased the items, intended recipients of the packages, destination location of the packages, fees charged for the item and/or the packages, the printer(s) that printed the packages, the origin or source of the items, times at which the items were packaged, or any other information about the items packaged, the packages, the customers, recipients. Additionally or alternatively, the computing device 802 may be in communication, via the network connections 834, with one or more other computing devices storing copies of the distributed ledger.

When the item is placed in the scanning area 810, the scanner 806 may scan the item. From the scan, the computing device 802 may obtain information to determine the nature of the item from one or more sources. For instance, as discussed above, the computing device 802 may recognize the item based on a product identifier or based on object recognition. If the computing device 802 recognizes the item, the computing device 804 may query one or more data sources to obtain additional information about the item. For instance, the computing device 802 may reference the model store 828 to determine whether or not a computer model of the item exists. If a computer model of the item exists, the computing device 802 may reference an item model 830 corresponding to the item to determine the geometry, materials, weight, volume, density, and/or other characteristics of the item. If a computer model of the item is not available, the computing device 802 may scan the item using scanner 806 to determine one or more characteristics of the item. In some instances, the computing device 802 may have or be able to obtain (e.g., through external resources via the Internet) a complete item model 830 including exterior dimensions, interior dimensions, weight, volume, density, materials of construction, surface finish, and the like. In other instances, the computing device 802 may have a limited or partial item model 830, which describes less than all characteristics of the item. For instance, a limited or partial item model might only include exterior dimensions of the item.

Based on item model 830 the item, modeling module 822 may construct or obtain (e.g., through external resources via a network such as the Internet) a packaging model 832 for the item. The modeling module 822 may include a material palette 836 defining the materials that are available from which to construct a package for the item. The modeling module 822 may further include one or more packaging elements 838, such as templates and previously stored design elements. For instance, packaging elements 838 may include computer models of ribs, flanges, honeycomb structures, bubble structures, trusses, aerodynamic components (e.g., fuselage, wings, tail, etc.), or other design elements, features, or parts. The modeling module 822 may also include a physics engine 840 to model forces that are likely to be applied by and/or to the item during storage, shipping, and/or sale. In one example, the physics engine 840 may take into account characteristics of the item (e.g., size, shape, weight, fragility/durability, etc.) based on the item model 830, material properties (e.g., strength, elasticity, ductility, hardness, etc.) of the item and available packaging materials from the material pallet 836, forces to which the item may be exposed (e.g., gravity, inertia, impact, air resistance, etc.), and/or other factors (e.g., price, scarcity, shipping mode, storage location, intended use, etc.) obtained from item catalogs, product reviews, web sites, and/or other sources. In some examples, the modeling module 822 may additionally or alternatively take into account aerodynamic properties of the package in order to reduce air resistance of the package, configure the package to generate lift, configure the package to glide under its own weight and that of its payload, or other aerodynamic or hydrodynamic properties. In some instances, the physics engine 840 may obtain such information for an item at least in part from a product identifier of the item. The foregoing description is of just one example, and in other examples, the physics engine 840 and modeling module 822 may obtain information needed to perform their respective functions directly or indirectly from the enumerated sources, or from other available sources.

Based on the foregoing criteria, modeling module 822 may generate the packaging model 832 customized for the item to withstand the forces that are likely to be applied. For example, the physics engine 840 may determine that, based on a strength and weight of the item and a distance that the item is likely to be dropped during shipping, the packaging should be able to withstand a certain impact force. In another example, the physics engine 840 may determine that, based on the strength and weight item and a number of items that are commonly stacked on top of one another, the packaging should be able to support a certain static load. In some examples, the physics engine 840 may determine the size and shape of aerodynamic components necessary for a drone/package to glide a payload to its intended destination, may determine the location of the payload within the drone/package for optimal flight characteristics, etc. In some examples, the physics engine 840 may employ finite element analysis (FEA) or other mathematical techniques to model static and/or dynamic systems in which the item may be used/stored/shipped/flown and/or the forces to which the item is likely to be exposed.

In other examples, instead of computing the forces to which the item is likely to be subjected, the physics engine 840 may categorize the item into one or more categories and may apply predetermined packaging rules, designs, or templates corresponding to the one or more categories. For instance, if the item has a density less than a certain threshold the physics engine 840 may categorize the item as being a "light weight" item. The physics engine 840 may further categorize the item as being a "fragile" item if, for example, it has relatively thin spans of material, is made of a brittle or low strength material, or is for other reasons susceptible to damage. The physics engine 840 may then identify (e.g., from a look up table or matrix) one or more packaging structures to use for the item based on the categorizations of "light weight" and "fragile." The physics engine may further modify or customize the packaging structures based on, for example, the size, weight, or other characteristics of the item. For instance, the physics engine 840 may determine a packing structure or combination of packing structures (e.g., bubble and web structures in this example) to use to package an item based on its categorization (e.g., "light weight" and "fragile"). The physics engine 840 may then adjust the number of packing structures (e.g., number of bubbles and/or webs, in this example), size of packaging structures (e.g., width, height, thickness, diameter, etc.), quantity of material used to generate the packing structures (e.g., mass or volume), the material from which the packing structures are constructed (e.g., hard plastic, elastomer, metal, etc.), and/or other characteristics of the packing structures (e.g., corner rounding, gussets, fillets, etc.) according to the characteristics of the item. In some embodiments, the physics engine 840 may additionally or alternatively take into account the value of the item, constraints on the cost of the package (e.g., what the customer is willing to pay), constraints on the size and/or weight of the package (e.g., due to postal or other delivery requirements), or other considerations.

Additional details of the packaging structures are described in U.S. Pat. No. 9,248,611, to Divine et al., which is incorporated herein by reference.

In some examples, before and/or after the item is placed in the printing area 812, the item may have a release applied so that the 3D printed packaging does not stick to or damage the item. In one example, the computing device 802 may instruct the item manipulator to apply the release to the item, while in other examples the release may be applied to the item by another device or process prior to or after being placed in the printing area 812. In some examples, the release may comprise a chemical or material (e.g., corn starch, wax, paper, metal foil, etc.) applied to item to prevent the 3D printed packaging material from adhering or bonding to the item. In other examples, the release may comprise a property imparted to the item (e.g., an electrostatic charge, a polished surface finish, a cold temperature, electromagnetic radiation, etc.) that helps to prevent the 3D printed packaging material from adhering or bonding to the item. In still other examples, the release may be omitted (e.g., if the 3D printed packaging material does not adhere to the material of the item, if a gap is maintained between the item and the 3D printed packaging material during printing, and/or if it is desired that the 3D printed packaging material adhere or bond to the item). In still other examples, a release may be applied to some parts of an item but not other parts, such as limited corners or edge points of the item to allow the package to adhere to, or form a weak bond with, the item (e.g., to secure the package to the item during shipping). In such an example, the limited corners or edge points that are not coated with the release may be sized and positioned such that the adhesion or weak bonds may be easily broken upon opening the package to separate the item from the package. The release may be applied before, during, or (in the case where part of the package is printed before the item is placed in the printing area) after the printing process commences.

Once the packaging model 832 has been generated and the item is otherwise ready for packaging (e.g., any desired release has been applied, any other items that are to be packaged with the item are present, etc.), the computing device 802 may initiate the printing process. In some examples, the item may be placed in the printing area 812 before printing commences and the package may be printed around the item. In other examples, at least a portion of a package may be printed before the item is placed in the printing area 812. For instance, the computing device 802 may instruct the 3D printer 804 (e.g., via print module 824) to print a bottom or side surface and/or one or more support structures of a package prior to instructing the item manipulator 808 (e.g., via the manipulator module 826) to place the item into the printing area 812. The item manipulator 808 may then place the item into/onto the partially printed package (e.g., onto already printed support structures and/or into an already partially printed shell of a package), the computing device 802 may then cause the 3D printer 804 to print the remainder of the package around the item.

In some examples, the package printed by the printing process may be one continuous part. In that case, the package may completely encapsulate the item or may cover only part of the item. In the case that the package encapsulates the item, the package may provide an air and/or water tight package. In some examples, the package may be hermetically sealed. Because the package is 3D printed, the package may be seamless, minimizing chances that the package will catch on surfaces it comes into contact with and consequently minimizing the chances of damage to the package or the surfaces with which it comes into contact. The seamless surfaces of the package may also improve material handling capabilities. For instance, the seamless surfaces of the package may make the package easier to slide on conveyors, easier to pick up (e.g., with suction devices or grippers), easier to stack and load, etc. The seamless appearance may also provide a clean, aesthetically appealing appearance.

In other examples, the package maybe printed as multiple parts to facilitate opening or unpackaging the item. For instance, the package may comprise multiple parts that fit together like a 3D puzzle and/or are held in place by one or more other parts. Additionally or alternatively, the package may include one or more opening features to help assist in the opening of the package. By way of example and not limitation, the package may include one or more thinned or frangible regions where the package is configured to separate during opening, one or more tabs or finger holds configured to be grasped by a user, or the like.

The package may additionally or alternatively include one or more of the following features:

Aerodynamic or hydrodynamic features (e.g., fuselage, wings, tail, flaps, spoilers, vortex generators, winglets, nose cones, etc.);

thermal insulation (e.g., regions of material having a low coefficient of thermal conductivity such as wood, polystyrene, cellulose or glass fiber insulation, air or other gasses, and/or a vacuum) and/or electrical insulation (e.g., dielectric material);

vibration damping (e.g., regions of viscoelastic material such as rubber, silicone, synthetic polymers, wood, or composites including any of the foregoing);

crumple zones (e.g., features designed to fail before the rest of the package) to absorb energy of impacts;

child safety features (e.g., features requiring more strength, instruction reading ability, and/or dexterity to open than a typical child possesses);

tamper resistant and/or tamper evident features (e.g., features that will clearly show once the package has been opened or tampered with, such as for example, 2D or 3D water marks, frangible regions that will break if tampered with, materials or indicators that change color or otherwise indicate when they are exposed to air or humidity, ink or dye in the package that if punctured will discolor the package indicating the tampering);

desiccant material (e.g., received in pockets, pouches, or receptacles printed in the package and/or the package itself may be printed in whole or in part of a desiccant material);

all or part of the package may form an accessory for the item (e.g., a charging stand for an electronic device, a cover for an electronic device, a pill holder for medication, etc.); and/or the package may be made in whole or in part of a recyclable material (e.g., thermoplastic, glass, metal, ceramic, etc.), biodegradable material (e.g., cellulose based materials, sand with organic binder such as glycerin, etc.), and/or water soluble material (e.g., sucrose, glycerin, corn starch, gelatin, etc.) such that the entire package may be recycled and/or disposed of without any subsequent sorting or separating.

During or after 3D printing the package structure, one or more pieces of information may be printed onto the package. The information may include, for example, shipping information (e.g., sender and/or recipient address), postage for the package, a packing list of the item(s) in the package, shipping instructions (e.g., "fragile", "this end up," etc.), opening instructions, set up or assembly instructions, "quick-start instructions," description of features of the package (e.g., child safety, desiccant, etc.), warning labels (e.g., hazardous materials), a list of materials from which the package is constructed, a packaging license (e.g., "by opening this package you agree to be bound by the terms . . . "), a machine readable code (e.g., quick response code, bar code, 3D relief code, or the like), a date on which the package was printed, a location at which the package was printed, an entity that printed the package, an identifier of the printer that printed the package, or any other pertinent information. The information may be printed in 2D or 3D by the 3D printer 804 or by a 2D printer located in or proximate the printing area 812.

In some examples, the techniques described herein may be implemented at least in part using a 3D Printed Packaging System such as those described in U.S. Pat. No. 9,248,611, to Divine et al., which is incorporated herein by reference. In that case, packaging system may take into account aerodynamic considerations of the package/drone when generating the package model for the package/drone.

As discussed above, certain examples are described with reference to specific types of drones (e.g., quad-copter, fixed wing, etc.). However, the techniques described herein are not limited to any particular type of drone and are applicable to and/or usable with other drone types such as other aerial vehicles, land vehicles, water vehicles, and/or a spacecraft.

In some examples, drones may deliver items from distributed manufacturing facilities to destinations, such as residences, businesses, lockers, bins, landing pads, or any other location accessible to aerial, land, water, or spacecraft. In some examples, the contents, package models, destinations, delivery terms, and/or other information related to the package and/or drone may be written to a blockchain or distributed ledger to document the location of the package and/or drone during the manufacturing and delivery processes. These and other aspects of distributed manufacturing, shipping, delivery, and blockchain enabled packaging are described in U.S. patent application Ser. No. 15/721,731, filed Sep. 29, 2017, titled "Distributed Manufacturing," which is incorporated herein by reference.

What is claimed is:

1. A system comprising:
a vehicle comprising a first attachment mechanism; and
a 3D printed package comprising a second attachment mechanism, complimentary to the first attachment mechanism, the second attachment mechanism releasably coupled to the first attachment mechanism of the vehicle, the 3D printed package comprising a receptacle containing an item for transport,
wherein the item is separate from the vehicle and the vehicle is operable independent of the item,
wherein the 3D printed package comprises a first 3D printed package, and the system further comprising a second 3D printed package, and wherein the first 3D printed package is coupled to a top surface of the vehicle, and the second 3D printed package is coupled to a bottom surface of the vehicle, and
wherein the vehicle comprises an aircraft, and the receptacle containing the item for transport is disposed in at least one of a fuselage or a tail of the aircraft.

2. The system of claim 1, the 3D printed package further comprising one or more 3D printed physical connections adapted to structurally and releasably connect the 3D printed package to the vehicle.

3. The system of claim 1, wherein at least a portion of the vehicle is 3D printed.

4. The system of claim 1, wherein the vehicle comprises an autonomous vehicle.

5. The system of claim 1, further comprising:
a controller coupled to the vehicle, the controller configured to cause the first attachment mechanism to release the 3D printed package to a recipient,
wherein the first attachment mechanism comprises at least one of an electromagnet, a pneumatic pump, or a vacuum that is controllable to release the 3D printed package.

6. The system of claim 5, further comprising:
a receiver coupled to the vehicle, the receiver configured to receive an authentication credential of the recipient,
wherein the controller is configured to release the 3D printed package based at least in part on receipt of the authentication credential.

7. The system of claim 1, wherein:
the first attachment mechanism comprises at least one of a hook, a loop, a pin, a flange, a bracket, a strap, a notch, a latch, a thread, a snap connector, a tongue, a groove, or a twist connection, and
the second attachment mechanism comprises a complimentary attachment mechanism configured to engage with the first attachment mechanism to removably and nondestructively couple the 3D printed package to the vehicle.

8. The system of claim 1, wherein the first attachment mechanism comprises an electromagnet and the second attachment mechanism comprises a ferromagnetic material, such that the 3D printed package is coupled to the vehicle by a selectively releasable magnetic coupling.

9. The system of claim 1, wherein the 3D printed package comprises a payload area at least partially encapsulated or surrounded by packing material.

10. The system of claim 1, wherein the 3D printed package comprises one or more sensors.

* * * * *